United States Patent

Badenoch et al.

[11] Patent Number: 5,570,288
[45] Date of Patent: Oct. 29, 1996

[54] VEHICLE SUSPENSION CONTROL USING A SCALED WHEEL DEMAND FORCE

[75] Inventors: Scott W. Badenoch, Bloomfield Hills, Mich.; David A. Shal, Centerville; Scott A. Stacey, Kettering, both of Ohio

[73] Assignee: General Motors Corporation, Detroit, Mich.

[21] Appl. No.: 410,788

[22] Filed: Mar. 27, 1995

[51] Int. Cl.$^6$ ............................................. B60G 17/00
[52] U.S. Cl. .................. 364/424.05; 280/840; 280/707
[58] Field of Search ....................... 364/424.05; 280/840, 280/707; 180/41

[56] References Cited

U.S. PATENT DOCUMENTS

| | | | |
|---|---|---|---|
| 2,850,290 | 9/1958 | Borgmann | 280/112 |
| 3,278,197 | 10/1966 | Gerin | 280/124 |
| 3,858,902 | 1/1975 | Howels et al. | 280/124 R |
| 3,941,402 | 3/1976 | Yankowski et al. | 280/124 R |
| 4,468,050 | 8/1984 | Woods et al. | 280/707 |
| 4,468,739 | 8/1984 | Woods et al. | 364/424 |
| 4,544,868 | 10/1985 | Murty | 318/254 |
| 4,579,366 | 4/1986 | Doi et al. | 280/707 |
| 4,606,440 | 8/1986 | Buchanan, Jr. et al. | 188/319 |
| 4,634,142 | 1/1987 | Woods et al. | 280/707 |
| 4,696,489 | 9/1987 | Fujishiro et al. | 280/707 |
| 4,722,548 | 2/1988 | Hamilton et al. | 280/707 |
| 4,770,438 | 9/1988 | Sugasawa et al. | 280/707 |
| 4,815,575 | 3/1989 | Murty | 188/299 |
| 4,826,206 | 5/1987 | Immega | 280/711 |
| 4,844,493 | 7/1987 | Moniguchi et al. | 280/683 |
| 4,902,034 | 2/1990 | Maguran et al. | 280/707 |
| 4,907,154 | 3/1990 | Yashuda et al. | 364/424.5 |
| 4,907,680 | 3/1990 | Wolfe et al. | 188/299 |
| 4,909,534 | 3/1990 | Fukushima et al. | 280/707 |
| 4,924,392 | 5/1990 | Kurosawa | 364/424.05 |
| 4,937,748 | 6/1990 | Yonekawa et al. | 364/424.05 |
| 4,977,506 | 12/1990 | Hara et al. | 364/424.05 |
| 5,013,062 | 5/1991 | Yonekawa et al. | 280/707 |
| 5,056,812 | 10/1991 | Takehara et al. | 280/707 |
| 5,062,657 | 11/1991 | Majeed | 280/707 |
| 5,062,658 | 11/1991 | Majeed | 280/707 |
| 5,071,157 | 12/1991 | Majeed | 280/707 |
| 5,072,392 | 12/1991 | Tamiguchi | 364/424.05 |
| 5,097,419 | 3/1992 | Lizell | 364/424.05 |
| 5,106,053 | 4/1992 | Miller et al. | 251/129.05 |
| 5,142,476 | 8/1992 | Shibata et al. | 364/424.05 |
| 5,144,559 | 9/1992 | Kaminmura et al. | 364/424.05 |
| 5,276,621 | 4/1994 | Henry et al. | 364/424.05 |
| 5,282,645 | 2/1994 | Spakowski et al. | 280/707 |
| 5,305,860 | 4/1994 | Rotharmel et al. | 188/299 |
| 5,497,324 | 3/1996 | Henry et al. | 364/424.05 |
| 5,510,986 | 4/1996 | Williams | 364/424.05 |

FOREIGN PATENT DOCUMENTS

| | | |
|---|---|---|
| 0363153 | 11/1990 | European Pat. Off. . |
| 2594755 | 2/1987 | France . |
| 1111515 | 4/1989 | Japan . |

OTHER PUBLICATIONS

Nonlinear Observers—A State-Of-The-Art Survey, Journal of Dynamic Systems, Measurement & Control, vol. III/351, pp. 344–352, Sep., 1989, U.S.A.
Properties Of Min-Max Controllers in Uncertain Dynamical Systems, Siam Journal of Control & Optimization, vol. 20, No. 6, pp. 850–861, Nov., 1982, U.S.A.

(List continued on next page.)

Primary Examiner—Michael Zanelli
Attorney, Agent, or Firm—Anthony Luke Simon

[57] ABSTRACT

A method of controlling a vehicle suspension system comprising the steps of: determining a relative velocity between a wheel and the corner of a vehicle body; determining responsive to the relative velocity, according to a non-linear passive function, a raw wheel demand force; determining an average vertical velocity of the wheel; determining, responsive to the average vertical velocity of the wheel, a first scaling factor; multiplying the first scaling factor by the raw wheel demand force to determine a scaled wheel demand force; and controlling the vehicle suspension system responsive to the scaled wheel demand force.

6 Claims, 16 Drawing Sheets

OTHER PUBLICATIONS

Vibration Control Using Semi-Active Force Generators, ASME, May 19, 1974, pp. 619–626 Karnopp et al;.

An Application of Explicit Self-Tuning Controller to Vehicle active Suspension Systems, Twenty-Ninth IEEE Conference on Decision in Congrol, Hawaii (Dec. 1990).

Modern Control Engineering, Chapters 14 and 15, K. Ogata, Printice-Hall, Inc., NJ (1970).

Active Vibration Isolation of Truck Cabs, K. Majeed, 1984 American Control Conference San Diego, CA (Jun. 6–8, 1984).

Dual Processor Automotive Controller, K. Majeed, Proceedings of the IEEE Application of Automotive Electronics, Dearborn, MI (Oct. 19, 1988).

VEHICLE SUSPENSION CONTROL USING A SCALED WHEEL DEMAND FORCE

This invention relates to a variable force suspension system. The subject of this application is related to the subject of co-pending United States patent applications 08/410,794, 08/410,795, 08/411,184 and 08/409,441, all filed concurrently with this application, all assigned to the assignee of this invention and all having disclosures that are incorporated herein by reference. This invention is related to the subject of U.S. patent application, Ser. No. 08/358,925, filed on Dec. 19, 1994, now U.S. Pat. No. 5,510,988 and assigned to the assignee of this invention.

BACKGROUND OF THE INVENTION

Known variable force suspension systems include variable force shock absorbers and/or struts that provide suspension damping forces at a magnitude controllable in response to commands provided by a suspension system controller. Some systems provide control between two damping states and others provide continuously variable control of damping force.

In a known manner of control of a variable force suspension, the demand force for each variable force damper is determined responsive to a set of gains, the wheel vertical velocity and the body heave, roll and pitch velocities. An example system determines the demand force as follows:

$$DF_b = G_h H' + G_r R' + G_p P' + G_w v,$$

where $DF_b$ is the demand force, $G_h$ is the heave gain, $G_r$ is the roll gain, $G_p$ is the pitch gain, $G_w$ is the wheel velocity gain, $H'$ is the body heave velocity, $R'$ is the body roll velocity, $P'$ is the body pitch velocity and $v$ is the wheel vertical velocity. The portion of the demand force computation, $G_h H' + G_r R' + G_p P'$, represents the body component determined responsive to the body heave, roll and pitch velocities and the portion of the demand force computation $G_w v$ represents the wheel component determined responsive to the difference between the computed body corner velocity and the body-wheel relative velocity.

A control signal representing the determined demand force is output to control the variable force damper responsive to the demand force. Example systems are described in U.S. Pat. Nos. 5,235,529, 5,096,219, 5,071,157, 5,062,657, 5,062,658, all assigned to the assignee of this invention.

SUMMARY OF THE PRESENT INVENTION

Advantageously this invention provides a control system for a variable force suspension that seeks to improve the performance and optimize control of a variable force suspension system.

Advantageously, this invention provides a system for controlling a variable force suspension in which a passive wheel control is introduced to reduce ride harshness transferred to the vehicle body through the suspension system and to eliminate dependence upon a linear gain for determining a wheel component of the demand force.

Advantageously, this invention provides control for a variable force suspension system that introduces a variable scaling factor to the passive wheel control to improve suspension system performance.

Advantageously, this invention provides a control system for a variable force suspension that reduces body harshness felt by vehicle passengers without reducing wheel control.

Advantageously, this invention provides a control system for a variable force suspension that, after occurrence of a road disturbance, minimizes the amount of time that the suspension is in wheel mode, which is the mode during which the wheel undergoes high velocity vertical movement after hitting a bump.

Advantageously, this invention reduces trade-offs between passenger isolation and wheel control in a variable force suspension.

In contrast to the prior art described above, this invention does not simply sum wheel or suspension velocity multiplied by a gain factor with the body velocities multiplied by gain factors. Instead, according to this invention, wheel and body demand forces are determined separately and the wheel demand force is determined, not by multiplying the suspension relative velocity by a gain factor, but by applying a non-linear passive function to the suspension relative velocity. More particularly, the suspension relative velocity is input into a function control and a demand force is output thus providing the passive wheel curve for developing the wheel demand force. The wheel demand force is then scaled by a factor ranging between 0 and 100% determined responsive to the average vertical wheel velocity. The resultant scaled wheel demand force is then used together with the body demand force that is output to the suspension system actuator. Through the actuator demand force, the system controls the level of damping provided by the actuator, and thereby controls the vehicle suspension system.

More particularly, the method of this invention is embodied in a control system for a vehicle suspension system comprising the steps of: determining a relative velocity between a wheel and the corner of a vehicle body; determining responsive to the relative velocity, according to a non-linear passive function, a raw wheel demand force; determining an average vertical velocity of the wheel; determining, responsive to the average vertical velocity, a scaling factor; multiplying the scaling factor by the raw wheel demand force to determine a scaled wheel demand force; and controlling the vehicle suspension system responsive to the scaled wheel demand force.

A more detailed description of this invention, along with various embodiments thereof, will be set forth below.

DETAILED DESCRIPTION OF THE INVENTION

Figure 1:
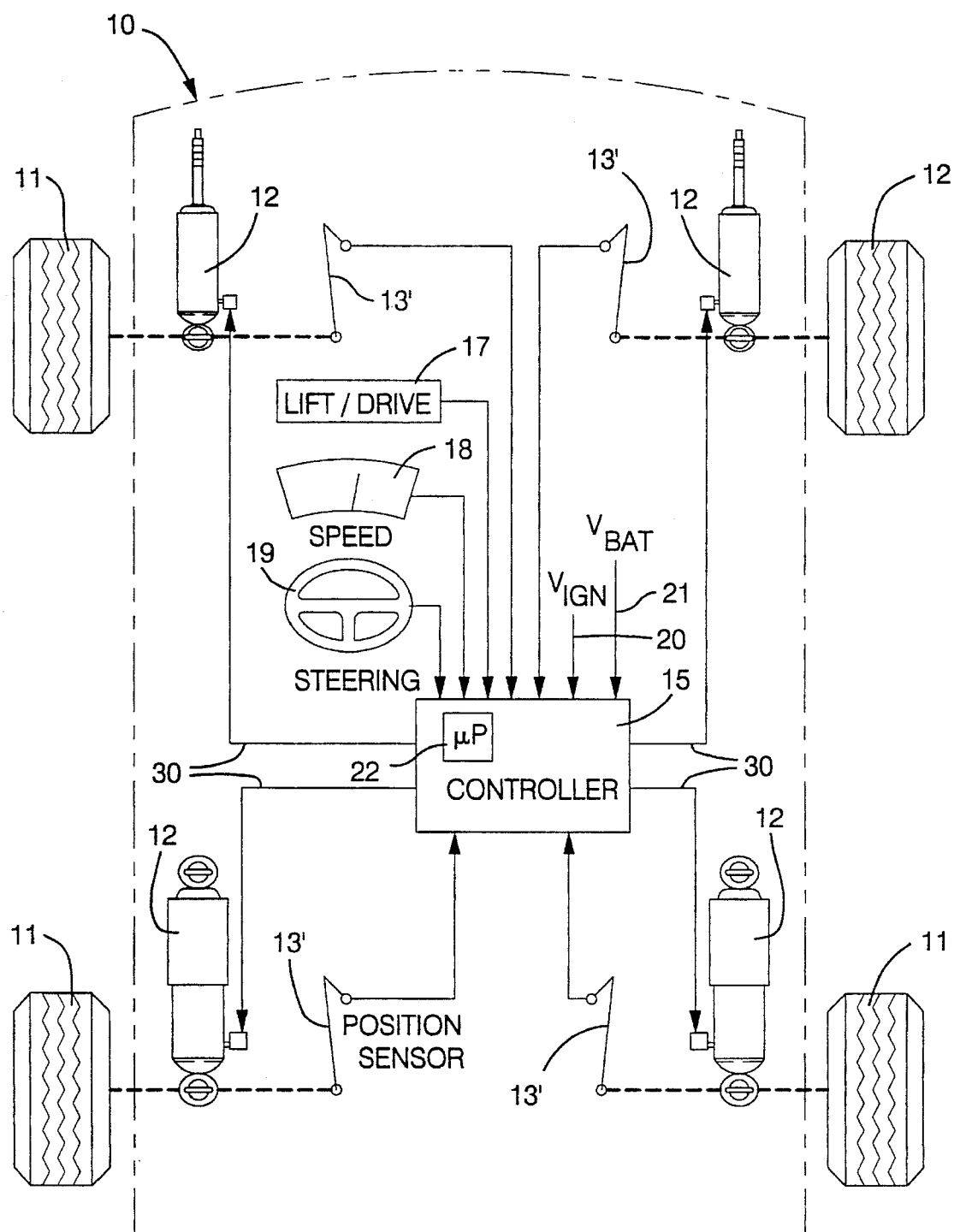
FIG. 1 illustrates an apparatus according to this invention.

Referring to FIG. 1, an example apparatus for implementation of this invention is shown and, in general, comprises a vehicle body 10 supported by four wheels 11 and by four suspensions including springs of a known type (not shown). Each suspension includes a variable-force real time controllable damper 12 connected to exert a vertical force between wheel 11 and body 10 at that suspension point. Although many such suspension arrangements are known and appropriate to this invention, actuator 12 of this embodiment comprises an electrically controllable, variable force damper in parallel with a weight bearing coil spring in a parallel shock absorber/spring or McPherson strut arrangement. A description of a variable force damper suitable for use as actuator 12 is the continuously variable damper described in U.S. Pat. No. 5,282,645, assigned to the assignee of this invention.

Each corner of the vehicle includes a linear position sensor 13 that provides an output signal indicative of the relative distance between the vehicle wheel and the suspended vehicle body at that corner of the vehicle. Suitable position sensors 13 can be easily constructed by those skilled in the art. The outputs of the position sensors 13 may be differentiated to produce relative body-wheel vertical velocity signals for each corner of the vehicle and may be used, in the manner described below, to determine the body modal velocities of body heave velocity, body roll velocity and body pitch velocity.

An example position sensor 13 includes a rotary resistive device mounted to the vehicle body and a link pivotably coupled between both the vehicle wheel and a pivot arm on the rotary resistive device such that the rotary resistive device provides an impedance output that varies with the relative position between the wheel 11 and the corner of the body 10. Each position sensor 13 may further include an internal circuit board with a buffer circuit for buffering the output signal of the rotary resistive device and providing the buffered signal to the controller 15. Suitable position sensors 13 can be easily constructed by those skilled in the art. Any alternative type of position sensor, including transformer type sensors, may be used as position sensor 13.

The outputs of relative position sensors 13 are provided to a controller 15 which processes the signals to determine the states of vehicle body 10 and wheels 11 and generates an output actuator control signal for each variable actuator 12. These signals are applied from controller 15 through suitable output apparatus to control actuators 12 in real time. Input signals for the determination of the output actuator control signals may also be provided to microcomputer to provide anticipation of vehicle pitch (lift/dive) 17 (described below with reference to FIG. 2) or by a vehicle speed sensor 18 and a steering wheel angular position sensor 19 to provide anticipation of vehicle roll. Obtaining such signals is easily achieved through the use of known types of sensors available to those skilled in the art.

Figure 2:
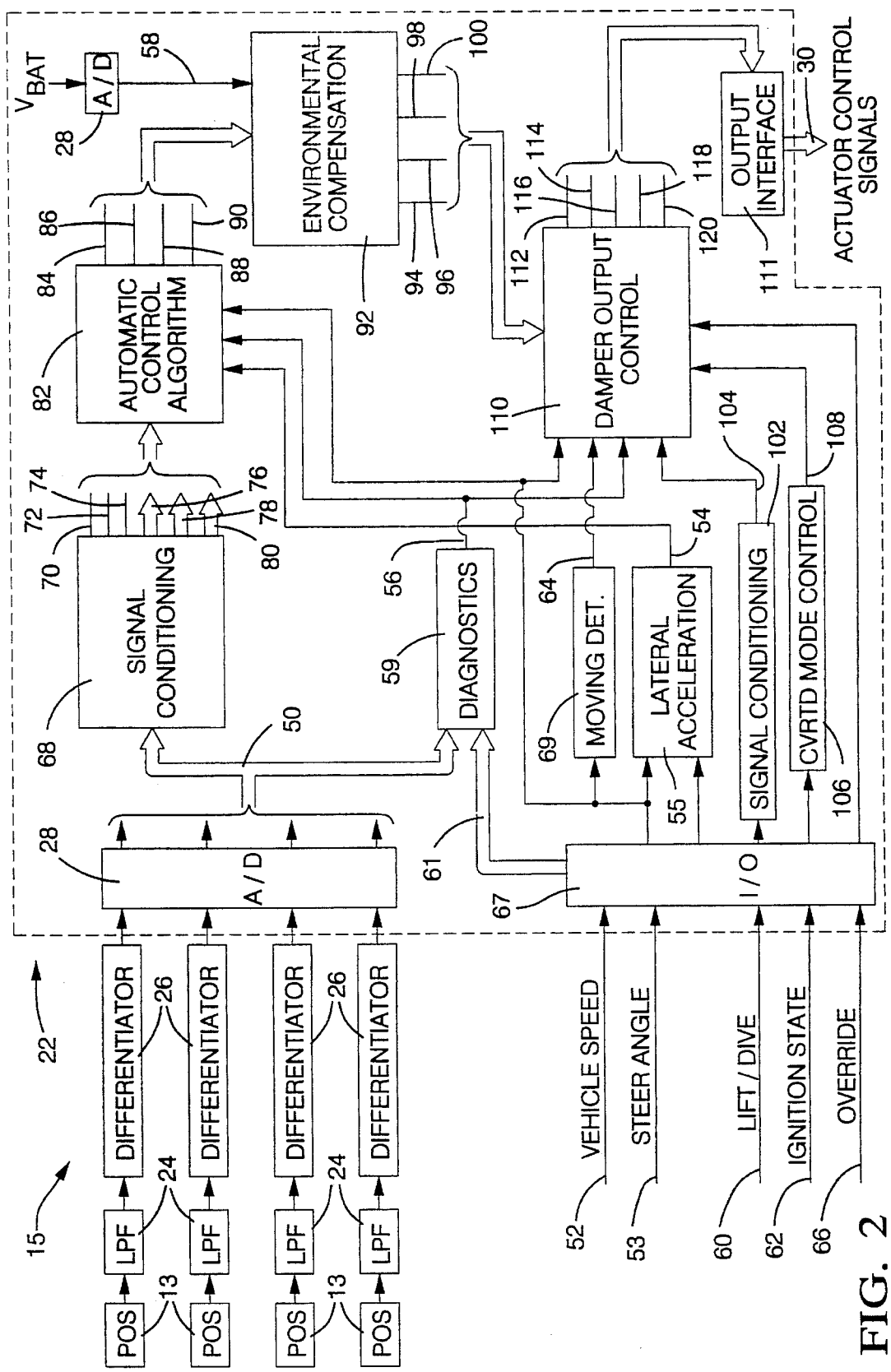
FIG. 2 illustrates an example control structure for a system implementing this invention.
Figure 3:
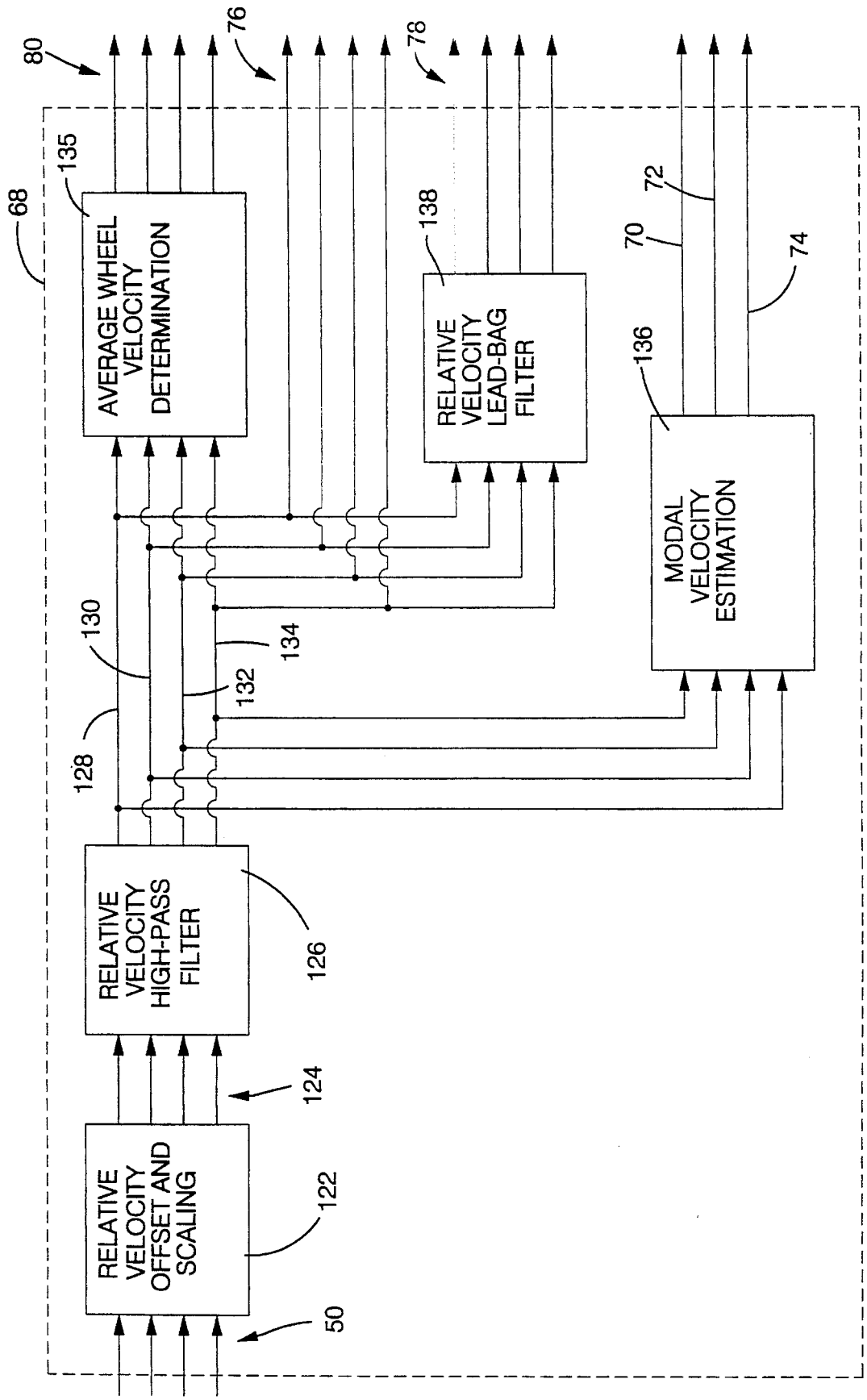
FIG. 3 illustrates a block diagram for determining body velocities and corner relative velocities for use with this invention.

Controller 15 is shown in more detail in FIG. 2. Signals from relative position sensors 13 are low-pass filtered through four analog low-pass filters 24 and differentiated through four analog differentiators 26 to provide four relative velocity signals. An exemplary combination of such a low pass filter and differentiator is shown in U.S. Pat. No. 5,255,191, issued Oct. 19, 1993. The resulting relative velocity signals represent the relative velocity between the from left wheel and the from left corner of the body, $rv_1$, the rear left wheel and the rear left corner of the body, $rv_2$, the from right wheel and the front right corner of the body, $rv_3$, and the rear right wheel and the rear right corner of the body, $rv_4$. Each of these relative velocity signals is input to a digital microcomputer 22, which includes an input A/D converter 28 with multiplexed inputs; and each is digitally high-pass filtered within microcomputer 22 to remove any DC offset introduced by the digitation of A/D converter 28. The relative velocity signals, processed as described below with reference to FIG. 3, are provided on buses 76, 78 and 80, together with the body modal velocity signals on lines 70, 72 and 74 as a set of inputs to a control algorithm to help determine the output actuator control signals for the vehicle suspension system.

According to this invention, control of the variable force suspension system actuator is not simply an additive control of body and wheel force components, as is known in the prior art. While the prior art method of additive control of body and wheel force components was found to improve suspension performance, this invention implements a method of control that offers further performance improvements including minimization of the transfer of suspension harshness to the vehicle body without sacrificing wheel control. This invention achieves these advantages by implementing a control method that treats the body and wheel effects on the suspension system separately and controls the variable force actuators responsive to both the body and wheel effects in a manner dependent upon the operating condition of the suspension system as it affects the separately determined body and wheel controls.

Further in distinguishing from the prior art, the wheel controls are not determined in a linear manner such as by multiplication of a gain factor by the corner suspension relative velocity. Instead, the wheel control is based on what is referred to herein as a passive curve. That is, the wheel control is a non-linear function of the relative velocity represented by $DF_n = F(rv_n)$ (n=1, 2, 3, 4). Where F represents the non-linear function that is implemented as described in more detail below via a look-up table.

Further, according to this invention, the wheel control is determined not simply as a function of wheel speed, but is scaled as a function of the average vertical wheel velocity and also preferably by a factor responsive to computed lateral acceleration of the vehicle. Thus, the wheel control component of this invention, determined according to the average vertical wheel velocity, has the capability of boosting the wheel control component when greater averages of vertical wheel velocity occur indicating that the system is more entrenched in the wheel hop mode. Further, taking into account computed lateral acceleration of the vehicle offers the capability to boost wheel control during cornering.

According to this invention, the wheel and body force components are not just simply added as done according to the prior art. Instead,- according to the method of this invention, the wheel and body control components are combined in two different manners, based on two different possible modes of control. If the body and the wheel control components are in-phase, a first mode of control based on the wheel command as a minimum is used. That is, the demand force to the controllable suspension system actuator is set equal to the body demand force if the body demand force is equal to or greater than the wheel demand force, otherwise, the demand force for the actuator is set equal to the wheel demand force. In this manner, the demand force to the actuator is always equal to at least the wheel demand force.

If the wheel and body demand forces are out-of-phase, a second mode of control is used in which the wheel and body demand forces add in a manner similar to that known in the prior art. The result of this dual mode of control is both the reduction in body accelerations felt by the vehicle operator and the shortening of the time required for the suspension system to move from wheel hop mode to body mode for improved vehicle performance.

Referring to FIG. 2, a general block diagram of the control of this invention illustrates the processing of the input signals and the output of the control signal for control of the variable force actuators. It is assumed that the actuators are controlled by a PWM control. However, actuators of another type not based on PWM control can be substituted as an alternative and it will be recognized that variable force controls other than those with PWM control are equivalents to the PWM control example set forth herein.

The control is performed by a microprocessor suitable for providing PWM control output. Such microprocessors are known and readily available to those skilled in the art. The output of the control shown in FIG. 2, the PWM duty cycle commands on lines 112, 114, 116 and 118, may be in the form of signals representing duty cycles that standard microprocessors readily convert to the proper duty cycle PWM output, for example, vis-a-vis a standard PWM output interface 111.

Reference 50 represents four input signals of the relative velocities of the four corner suspensions of the vehicle. The relative velocities are determined from the position sensors 13 by low pass filtering the outputs of sensors 13 through four analog low pass filters 24. The filtered outputs are then differentiated through four analog differentiators 26 to provide the four relative velocity signals representing the relative velocity between the front left wheel and front left corner of the vehicle body $rv_1$, the rear left wheel and rear left corner of the body $rv_2$, the front right wheel and front right corner of the body $rv_3$ and the rear right wheel and rear right corner of the body $rv_4$. Each of these relative velocity signals is input into the microprocessor 22 through an A/D converter and result as the signals on lines 50 shown.

In an alternative example implementation, relative position sensors 13 are replaced with relative velocity sensors of a type known to those killed in the an capable of outputting a signal indicative of the relative velocity between each wheel and corner of the vehicle body. In this alternative, there is no need for the differentiators described above used to convert the signals from sensors 13 to relative velocity signals.

Various discrete signals are provided to the microprocessor input/output port, illustrated schematically as reference 67. Line 52 carries a signal representing the vehicle speed and is preferably buffered in a known manner to remove unwanted noise. Line 54 represents an input of computed lateral acceleration of the vehicle that is computed in a known manner (block 55) based on the steer angle of the front wheels (on line 53), which may be determined from sensing the position of steering wheel 19 (FIG. 1), and based on vehicle speed. Line 56 represents an input from a standard diagnostic routine (block 59) that performs known diagnostic functions such as checking for open circuits and short circuits from the sensors 13 or actuators 12 or any of the other input lines (represented in general as bus 61). In response to a diagnostic failure command on line 56, control block 110 forces a default output on lines 112, 114, 116 and 118 to control the actuators in a default mode.

Input line 58 is a digital signal representing the battery voltage that is input through the microprocessors A/D converter 28 and is used at block 92 to scale the duty cycle commands responsive to the battery voltage. The signal on line 60 is a signal that indicates the vehicle is in a dive (front end dip) or lift (front end rise) tendency situation such as occurs during hard braking or hard acceleration of the vehicle. This signal may be provided by a powertrain controller that determines a vehicle dive tending situation if a decrease in vehicle speed over a predetermined time period is greater than a predetermined limit and determines a lift tending situation if an increase in throttle angle over a predetermined time period is greater than a predetermined threshold. In general, the signal on line 60 is active when there is either a detected lift or dive, and is otherwise inactive.

The signal on line 62 is representative of the ignition voltage available when the vehicle is keyed on and is de-bounced in a known manner. The signal on line 64 indicates whether or not the vehicle is moving (block 69), for example, line 64 goes high when the vehicle speed is greater than 3 miles per hour. Line 66 is an override line that can be used for in-plant testing of the system. For example, a signal on line 66 can cause the dampers to cycle and the service operator can test the dampers to determine if they are cycling properly.

In general, the corner relative velocity signals on lines 50 are input to the signal conditioning block 68, which performs the functions illustrated in more detail in FIG. 3 to provide signals on lines 70, 72 and 74 of the vehicle body heave, roll and pitch velocities, on bus 76 (four signals), which are high pass filtered relative velocity signals for the four corners of the vehicle, on the bus 78 (four signals), which are lead-lag filtered relative velocity signals, and on the bus 80 (four lines), which represent the average vertical velocities of the four wheels of the vehicle.

More particularly, referring now also to FIG. 3, a determination of the signals on lines 70–80 can be better understood. At block 122 the relative velocity input signals from the microprocessor's A/D converter are offset by a predetermined amount to compensate for the offset introduced during the A/D conversion. Further, block 122 scales the relative velocity signals to a scale, easily predetermined by a system designer, so that the scaled value represents wheel motion. The scaling is achieved by simply multiplying the offset results by a predetermined scaling factor. The results of block 122 are the offset, scaled relative velocity signals on lines 124. The signals on lines 124 are provided to block 126, which performs a digital high pass filtering of the signals on lines 124 to further remove any DC offsets introduced by the digitation of the A/D converter. The resultant high pass filtered relative velocity signals for the four corner suspension are provided on lines 128, 130, 132 and 134 to the three blocks 135, 136 and 138, which perform the average vertical wheel velocity determinations, the body modal velocity determinations and the relative velocity lead-lag filtering respectively.

More particularly, block 135 determines the average vertical wheel velocity by first high pass or band pass filtering separately each of the signals on lines 128–134 to isolate the wheel content of each relative velocity signal from the body content. That is, the high pass or band pass filter eliminates the 1 Hz. component while passing the 10 Hz. component of the signal. Next, the output of the high pass filter is rectified or its absolute value is taken in order to obtain the magnitude information of the output signal. Then, to integrate or average the magnitude information, a low pass filter is applied to each of the rectified signals so that, as a result, each of the lines 80 carries a signal indicative of the average wheel velocity of one of the four wheels.

An example high pass filter for isolating the wheel component of each signal on lines 128–134 can be implemented using the equation:

$$V_{av}(k) = rv_x(k) - rv_x(k-1) + a*V_{av}(k-1),$$

where $V_{av}$ is the average vertical wheel velocity, k represents the current sampling period, $rv_x$ is the suspension relative velocity for corner x of the vehicle, and a is a predetermined constant, for example, 0.90.

An example low pass filter may be implemented according to the equation:

$$V_{av}(k) = b*rv_x(k) + (1-b)V_{av}(k-1),$$

where b is a constant with example values equal 0.01, 0.002 and 0.001.

Referring now to block 136, the determination of body heave, roll and pitch velocity is carried out in the manner described in the above-referenced pending patent application, Ser. No. 08/358,925. More particularly, block 136 receives the relative velocity signals on lines 128–134 and first performs a set of geometric transforms to obtain the relative states of relative heave velocity, relative roll velocity and relative pitch velocity between the vehicle body and wheels.

The geometric transforms used to obtain the relative heave velocity ($rv_H$), relative roll velocity ($rv_R$), and relative pitch velocity ($rv_P$) are implemented respectively as follows:

$$rv_H = (rv_1 + rv_2 + rv_3 + rv_4)/4,$$

$$rv_R = (-rv_1 + rv_3)/tw,$$

$$rv_P = (-rv_1 + rv_2 - rv_3 + rv_4)/(2*wb),$$

where tw is the average track width or wheel span of the vehicle and wb is the wheel base of the vehicle. In the determination of $rv_R$, only $rv_1$ and $rv_3$ are used in vehicles in which flexing or noise of the rear suspension affects the quality of the relative roll velocity determined using $rv_2$ and $rv_4$. If rear suspension flexing or noise does not affect the relative roll velocity determination, then the determination of $rv_R$ can be set forth according to:

$$rv_R = (-rv_1 - rv_2 + rv_3 + rv_4)/(2*tw).$$

Once each of the transforms is completed, a digital low pass filter filters each of the relative heave, roll and pitch velocities to derive accurate estimates of the body heave, roll and pitch velocity.

The low-pass filters provide a significant amplitude roll-off above the 1 Hz signals typical of resonant body modal vibrations so as to suppress the 10 Hz signals typical of resonant vertical wheel vibrations and thus yield a signal with information about the amplitude of vehicle body motion in the heave, roll and pitch modes. However, for such signals to be usefully applied in a real time control system, their phase is critical. Low pass filters tend to produce a phase lag in the signal and this phase lag increases across the frequency spectrum through a range that increases with the number of filter poles. In order to produce effective control, in real time, of rapidly moving suspension components, the control signal must be applied in correct phase relationship thereto. In order to emulate the integrated output of an absolute accelerometer, a phase lead of approximately 90 degrees is required, while a low pass filter generally produces a phase lag. However, it has been found that a two pole low pass filter applied to the relative body modal velocity signal will produce a signal with a 90 degree phase lag, which can be inverted to provide the required 90 degree phase lead.

A suitable second order low pass filter for use in the estimation is described as:

$$H_Q(s) = K_Q[\omega_o^2/(s^2 + (\omega_o/Q)s + \omega_o^2)],$$

where $K_Q$ is the filter gain, $\omega_o$ describes the filter pole locations in radians and Q is the filter quality factor.

Each low pass filter may be adjusted independently to tune the resultant modal velocity estimates to match in magnitude and, with an additional phase inversion, in phase, signals achieved by the prior art utilizing accelerometers or to match the performance of another device such as an external velocity sensor or gyroscope from which the same measurements may be obtained. The values of the filter gains, pole locations and quality factor tend to change from vehicle type to vehicle type due to differences in the natural body and wheel frequencies of different vehicle models. The heave, roll and pitch velocities obtained are estimations since they are derived from relative measurements and not from absolute measurements.

In one example, the continuous time parameters for the low pass filter are shown in the following table:

| MODE | $K_q$ | $\omega_o$ | Q |
| --- | --- | --- | --- |
| HEAVE | −13.889 | 3 | 0.35 |
| ROLL | −18 | 5 | 0.50 |
| PITCH | −7.8125 | 4 | 0.40 |

Figure 4:
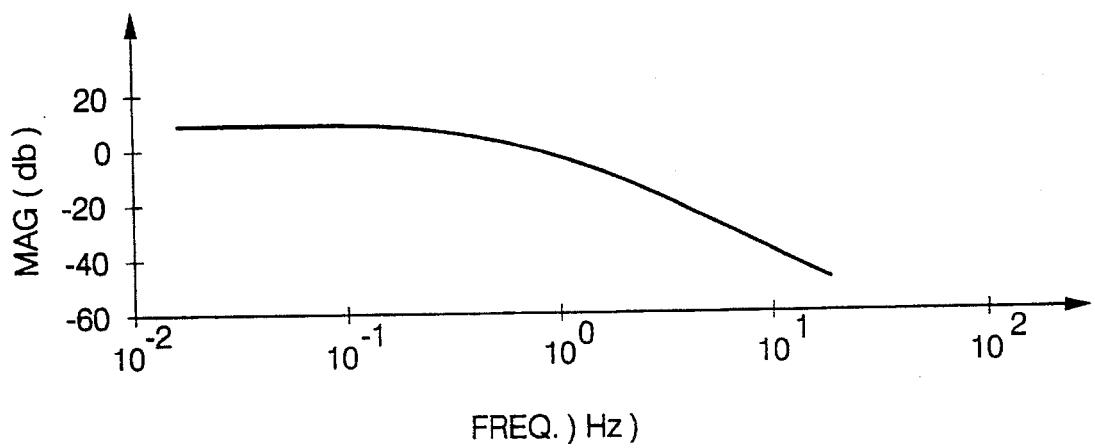
FIGS. 4 and 5 are graphs of response of a filter implemented with this invention.
Figure 5:
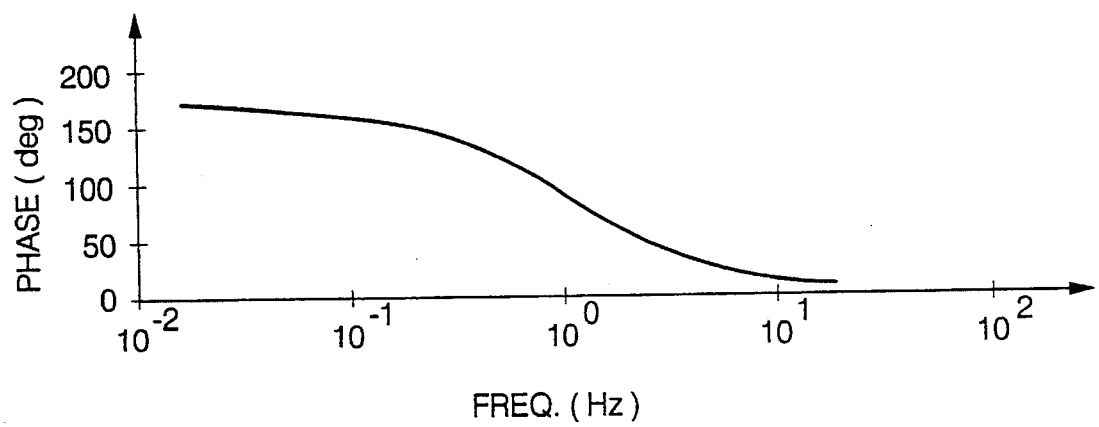

Typical magnitude and phase frequency responses for the two pole, low-pass filters are shown in FIGS. 4 and 5, respectively. FIG. 4 shows the roll-off in amplitude above 1 Hz, which provides an output signal having mainly vehicle body movement information. FIG. 5 shows the phase response of a two pole, low pass filter having an additional phase inversion. Without the additional phase inversion, the phase curve would be shifted downward by 180 degrees—starting at zero degrees at the left side of the graph and decreasing with increasing frequency—to provide a 90 degrees phase lag at 1 ($10^0$) Hz. With the additional phase inversion, however, the curve is shifted upward to provide a 90 degree phase lead at 1 Hz. Thus, the filter output has the desired phase relationship at the frequency of body resonance. In the table produced above, the additional phase inversion is achieved through the minus sign of the constant $K_q$.

The results of block 136 are the outputs of body heave, roll and pitch velocities on lines 70, 72 and 74.

The lead-lag filter at block 138 receives the relative velocity signals on lines 128–134, filters the signals and adds an approximate lead to the signal to compensate for phase lag that may be introduced within the system, including that of the differentiator circuit, at the expense of a certain degree of magnitude distortion.

More particularly, block 138 functions as follows: A single pole infinite impulse response high-pass filter is used to provide a desired amount of phase lead at wheel hop frequencies. Specifically, the filter may be implemented using the following transfer function:

$$H(z)=(LLA-LLBz^{-1})/(1-LLCz^{-1}),$$

where $H(z)$ is a discrete, or "z" domain transfer function relating the z-transform of the filter output to that of the filter input. LLA, LLB and LLC are calibration constants stored in memory.

In an example, assume that at a wheel-hop frequency of 14 Hz, approximately 20 degrees of phase lag is introduced into the relative velocity signal due to the system filtering, physical lag in the damper, and other system lags. To compensate for the phase lag, approximately 20 degrees of phase lead at wheel-hop frequency of 14 Hz is introduced by setting the coefficients LLA, LLB and LLC to calibrated values of 1.9521, 1.8564 and −0.9043.

The lead-lag filter transfer function may be implemented as follows:

$$Y(k)=LLA*X(k)-LLB*X(k-1)+LLC*Y(k-1),$$

where LLA, LLB and LLC are in Q15 format, $Y(k)$ is the LF, RF, LR or RR lead-lag filtered relative velocity output, $Y(k-1)$ is the $Y(k)$ from the previous filter loop, $X(k)$ is the LF, RF, LR or RR high-pass filtered relative velocity (the filter input), and $X(k-1)$ is the $X(k)$ from the previous loop of the filter.

The outputs of block 138 are the lead-lag filtered relative velocity signals for each corner of the vehicle on lines 78.

Referring again to FIG. 2, block 102 receives the lift/dive discrete signal on line 60 and performs a de-bounce function of a known type, providing the de-bounced lift/dive signal on line 104 to block 110. Block 110 (1) further buffers the lift/dive signal, (2) determines whether or not a floor profile output override is active and, if so, responsive to the lift/dive signal, determines what PWM duty cycle to use as the floor (minimum duty cycle) and (3) applies the time-varying lift/dive PWM duty cycle floor as the minimum PWM duty cycle.

The buffer limits to 10 seconds (as an example) the amount of time that the control system will follow a lift/dive signal. Thus, if a short circuit causes an erroneous lift/dive signal, the system is only affected for 10 seconds. The limitation on the effect of the lift/dive signal is achieved by setting a timer when the de-bounced lift/dive signal becomes active (a lift or dive is occurring) and forcing the lift/dive signal to be inactive if, after 10 seconds, the lift/dive signal remained continually active.

Whenever the buffered lift/dive signal is active, an associated minimum PWM duty cycle, referred to as the lift/dive PWM duty cycle floor, is computed as a function of time and the last inactive occurrence of the buffered lift/dive signal. When the buffered lift/dive signal is active, the lift/dive PWM duty cycle floor is set equal to a calibrated lift/dive floor stored in memory. The calibrated lift/dive floor is easily determined by one skilled in the art as the minimum PWM duty cycle desired during acceleration of the vehicle and will vary from vehicle to vehicle based on desired operator "feel" or ride comfort and performance.

When the buffered lift/dive signal is not active, the lift/dive PWM duty cycle floor is computed as a percentage of the lift/dive floor calibration based on the ratio relating the time since the last active signal to the lift/dive hold time calibration. The lift/dive hold time calibration is a predetermined constant setting the decay time of the lift/dive PWM duty cycle floor and can be easily determined by a system designer to provide a desired operator feel or vehicle performance.

Figure 6:
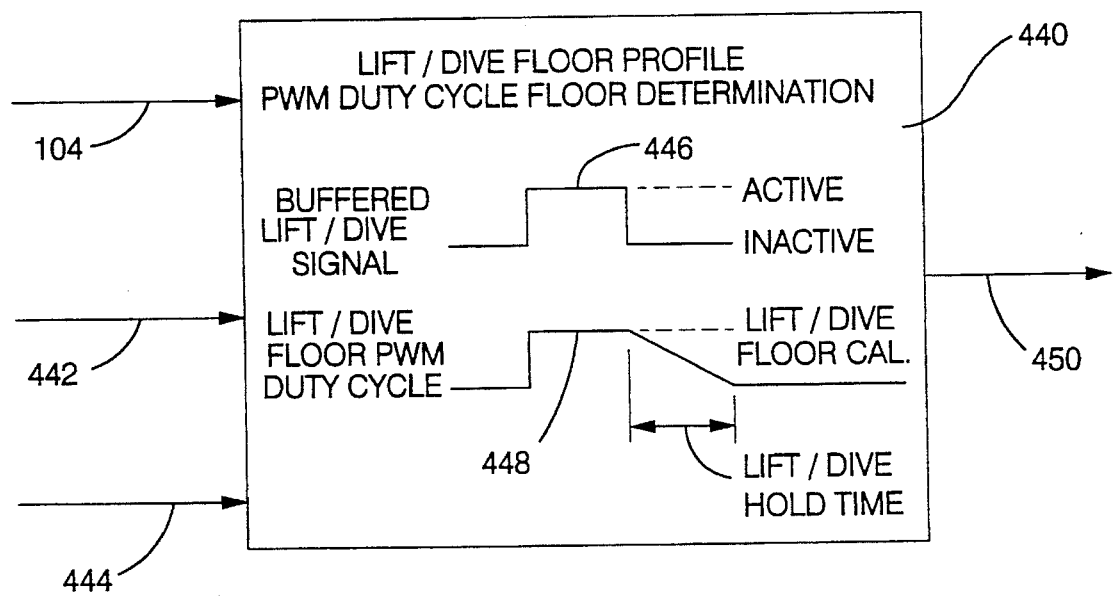
FIG. 6 illustrates an example portion of a control structure according to this invention.

FIG. 6 illustrates how the lift/dive PWM duty cycle floor is determined. Block 440 receives the buffered lift/dive signal on line 104 and the duty cycle floor and hold time calibrations from memory on lines 442 and 444. The buffered lift/dive signal on line 104 appears as trace 446 and the output lift/dive PWM duty cycle floor signal on line 450 obtains the shape of trace 448. When the buffered lift/dive signal is active, the signal on line 450 is equal to the lift/dive PWM duty cycle floor calibration and, after the buffered signal becomes inactive, the signal on line 450 decays over a time period equal to the hold time.

The signal on line 450 is applied at block 110 (FIG. 2) to limit the minimum PWM duty cycle of the actuator commands. Any actuator command with a duty cycle lower than the signal on line 450 is automatically set equal to the signal on line 450. Otherwise, the actuator commands are not affected by the signal on line 450. When there is no lift/dive activity, the signal on line 450 remains low and does not affect the actuator PWM commands.

Block 106 (FIG. 2), the mode control block, receives the ignition on signal on line 62 (which is preferably de-bounced) and, if the ignition on signal is active (indicating that the vehicle is on), outputs a signal on line 108 that enables the outputs of block 110. Without the enable signal on line 108, any commands determined will not be output on lines 112–120 and the controller is allowed to enter a standard "asleep" state of the type used in automotive controllers when the vehicle ignition is off. The signal on line 108 does not force any output command levels, but simply enables commands to be output from block 110.

Block 82 represents the control algorithm for implementing the variable force suspension control according to this invention and outputs on lines 84, 86, 88 and 90, filtered PWM duty cycle commands representing the force commands for each of the variable force actuators.

Figure 7:
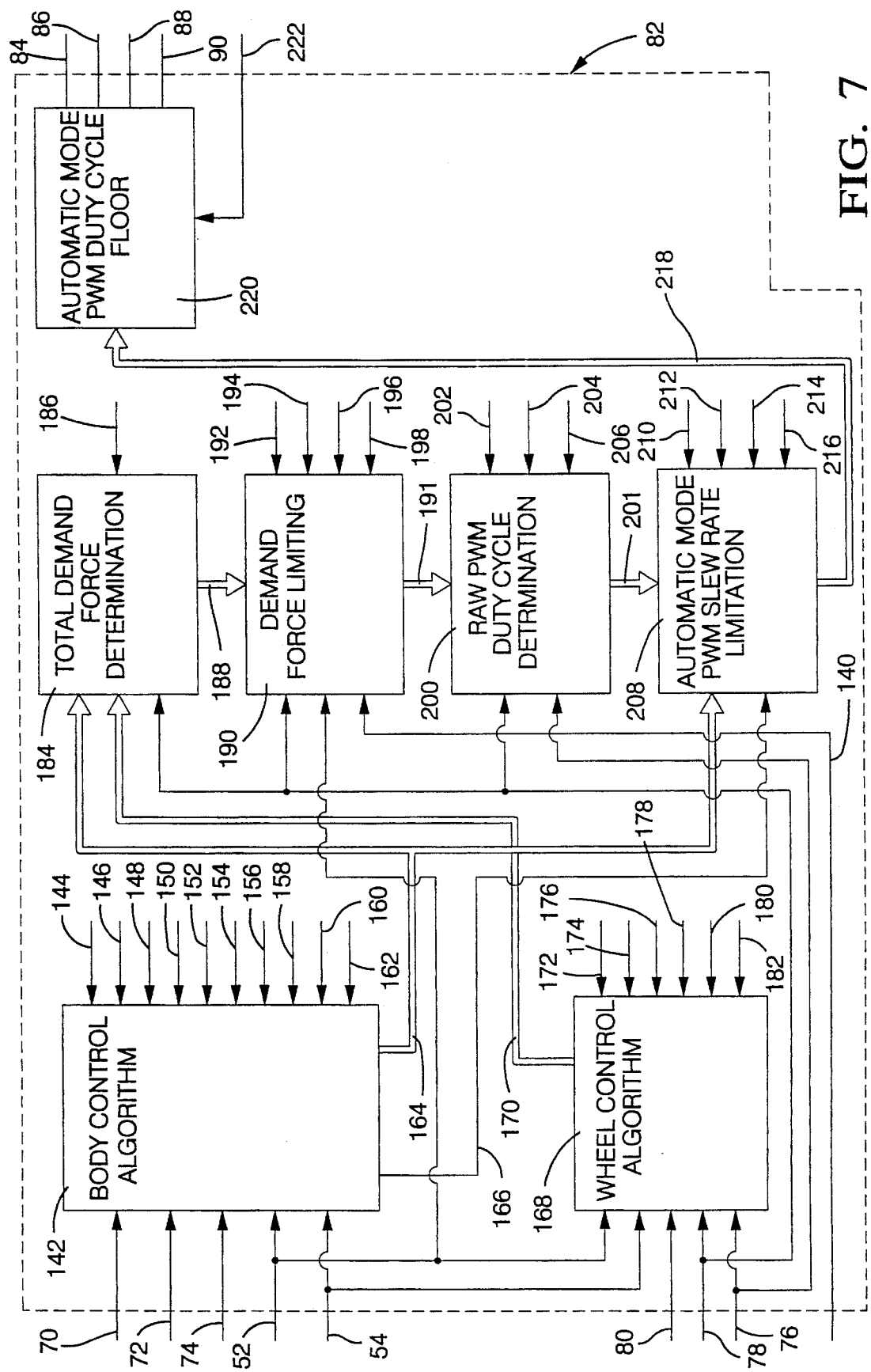
FIG. 7 illustrates a control diagram for determining demand force commands according to this invention.
Figure 8:
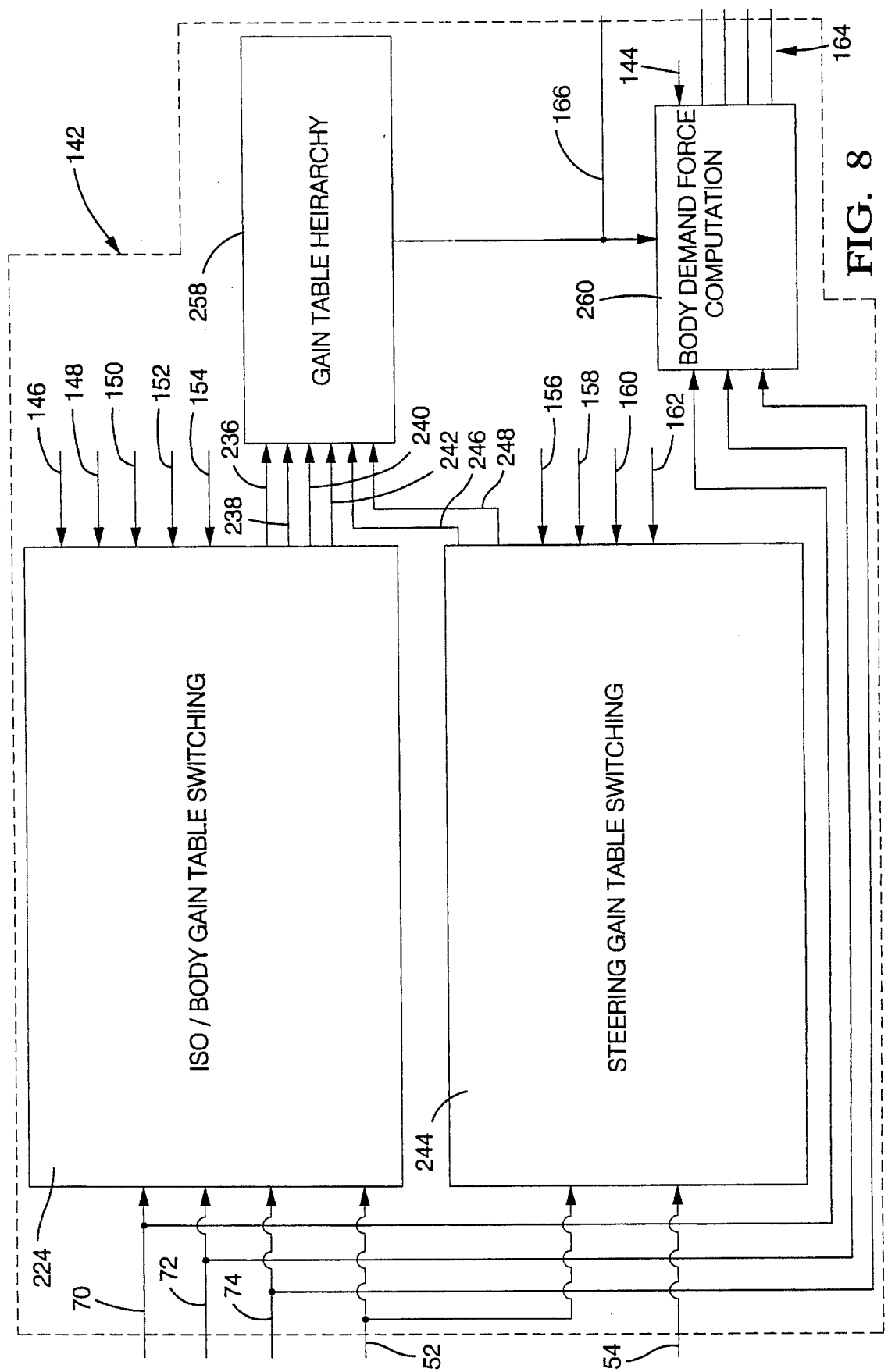
FIG. 8 illustrates a block diagram for determining body gains and demand forces according to this invention.

More particularly, referring now also to FIG. 7, block 82 is shown in more detail and includes body control block 142, which receives the body modal velocities on lines 70–74, the vehicle speed signal on line 52 and the computed lateral acceleration on line 54 and outputs a set of body demand forces on bus 164 (four lines) and gain table pointer on line 166. Block 142 will be explained in more detail now with reference to FIG. 8.

The body control, block 142, includes body gain table switching block 224, steering gain table switching block 244, gain sorting block 258 and block 260, which computes the body demand force for each corner of the vehicle. More particularly, block 224 receives the body heave, roll and pitch velocities on lines 70, 72 and 74 and the buffered vehicle speed signal on line 52 and receives from memory the calibrations on lines 146–154.

Figure 9:
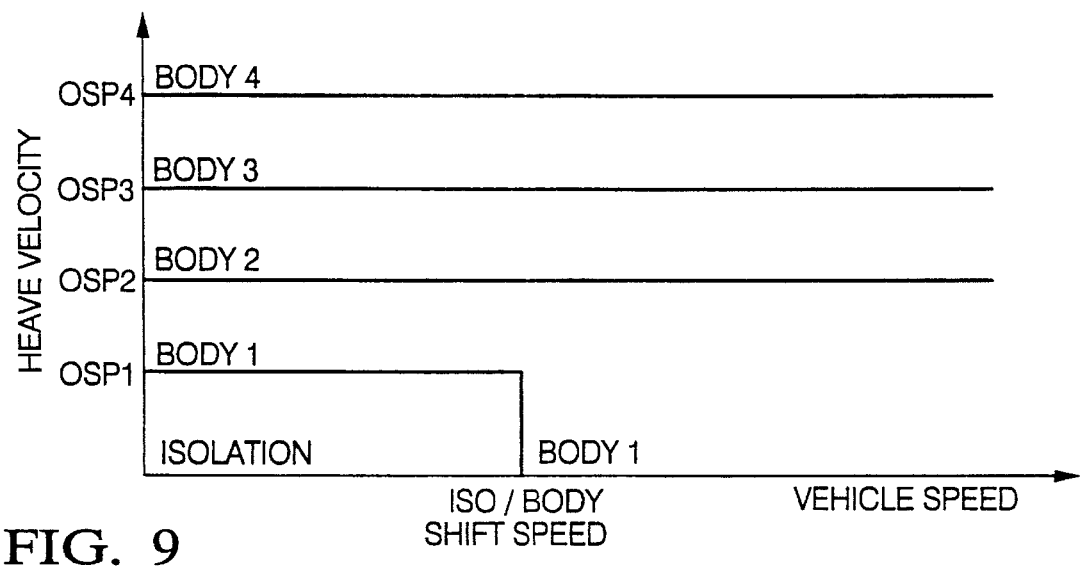
FIGS. 9, 10 and 11 and 12 illustrate graphs for selecting body gains in the control according to FIG. 8.
Figure 10:
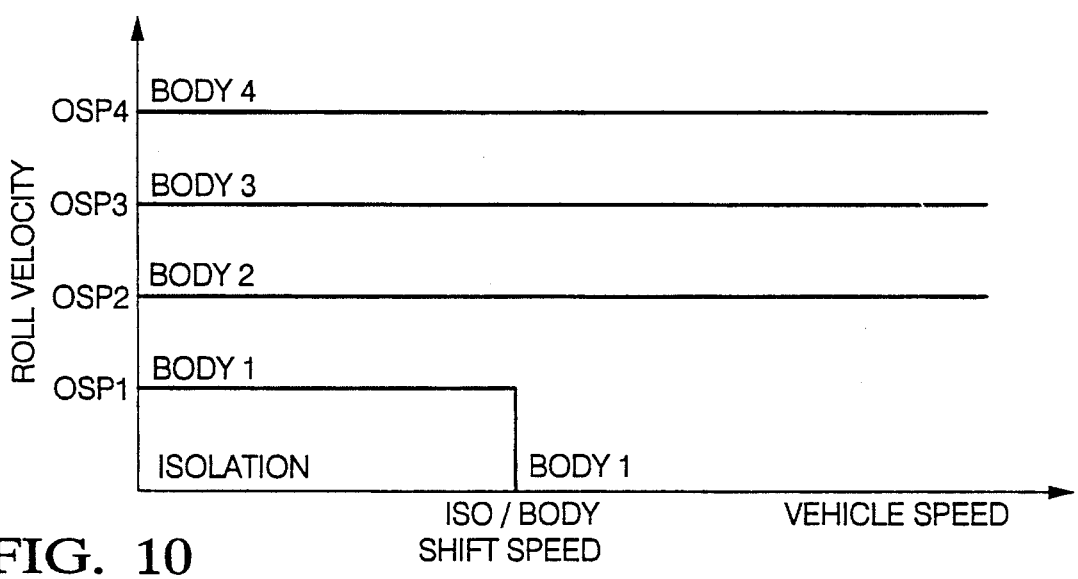
Figure 11:
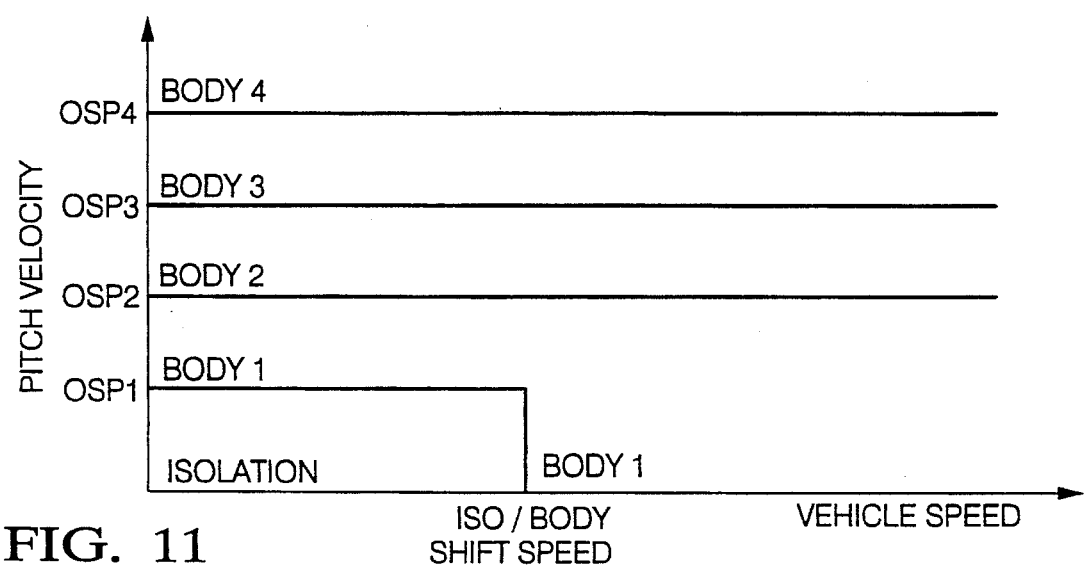

FIGS. 9, 10 and 11 illustrate example gain table implementations at block 224. In FIG. 9, vehicle speed is plotted against body heave velocity, in FIG. 10, vehicle speed is plotted against body roll velocity and, in FIG. 11, vehicle speed is plotted against body pitch velocity.

The calibration inputs on line 146 (FIG. 8) include the ISO/body speed calibration, which is a vehicle speed below which the isolation gain table is selected when neither heave, roll nor pitch velocity are above the outer switch point (OSP) 1. Line 148 represents the OSP points 1–4 for each of the heave, roll and pitch tables. The OSP points are the points above which the heave, roll or pitch velocities must rise before switching to the next highest body table. Thus, if the vehicle speed is below the ISO/body shift speed for the table shown, heave velocity must be above OSP 1 for the body 1 table flag to be set, above OSP 2 for the body 2 table flag to be set, above OSP 3 for the body 3 table flag to be set and above OSP 4 for the body 4 table flag to be set.

The calibrations also include the hold times represented by line 150 that operate as follows. When each body table flag is set, the routine is prevented from resetting that flag until after that flag has been set for its corresponding hold time. This prevents sporadic movement into and out of one of the body tables. Lines 152 and 154 represent the inner switch point (ISP) factors for the body tables. The ISP factors are the factors below which the velocity for that table must fall before the flags for that body table are reset. The ISP references are slightly below the corresponding OSP references to provide hysteresis in the switching between the tables.

The outputs of the body gain table switching block 224 are the flags for body 1, body 2, body 3 and body 4 tables on lines 236, 238, 240 and 242, respectively. The isolation table is selected when all of the body 1–4 table flags are reset. The flags on lines 236–242 are provided to the sorting block 258 along with the flags from block 244 on lines 246 and 248.

Figure 12:
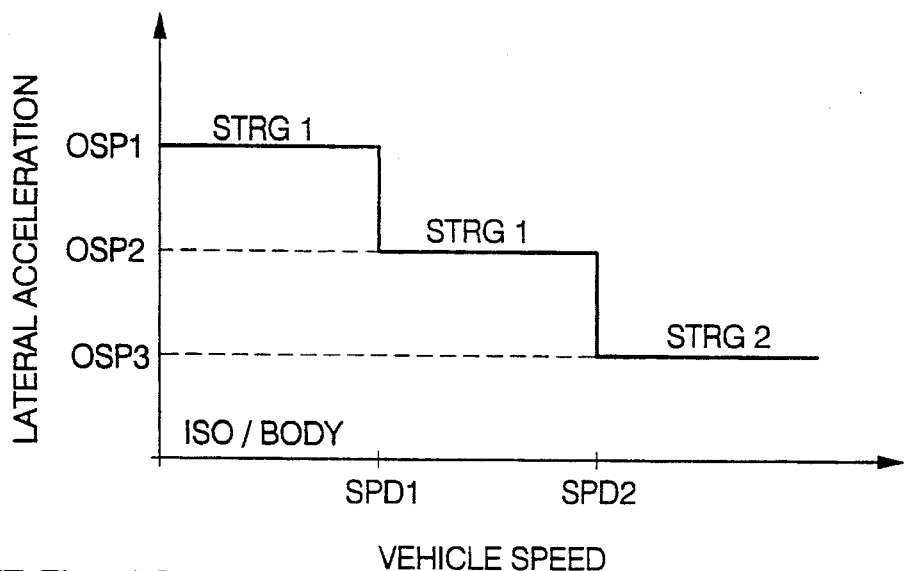

Block 244 selects flags that point to gain tables to take into account vehicle steering maneuvers. Input to block 244 are the buffered speed signal on line 52 and the vehicle lateral acceleration signal on line 54. While, as indicated above, lateral acceleration on line 54 may be computed responsive to vehicle speed and steer angle, it can also be provided from an accelerometer that measures actual vehicle lateral acceleration. Block 244 performs the single table function shown in FIG. 12 in which vehicle speed is plotted against lateral acceleration. Calibration inputs to block 244 are the steering OSP points 3, 2 and 1 (line 156) above which the lateral acceleration must rise to set the steering gain flags in the speed regions shown. The vehicle speed regions are divided between 0 and speed 1 (SPD 1), speed 1 and speed 2 (SPD 2), and above speed 2. The calibrations for speed 1 and speed 2 are provided by line 158 from microprocessor memory. The ISP factors or the factors below which the lateral acceleration must fall to reset any flags are represented by lines 160 and the hold time that is the minimum time for which a flag once set must remain set, is represented by line 162.

If the vehicle speed is below speed 1 and lateral acceleration rises above OSP 1, the steering table 1 flag is set. If the vehicle speed is between speed 1 and speed 2 and the lateral acceleration rises above OSP 2, then the steering table 1 flag is set. If the vehicle speed is above speed 2 and the lateral acceleration rises above OSP 3, then the steering table 2 flag is set. The steering table 1 and 2 flags are provided on lines 246 and 248.

At block 258, a sorting operation provides a gain table pointer output that selects the gain table to be used to compute the body demand force for each actuator at block 260. The sorting is provided according to a simple hierarchy as follows. In the absence of any flags on lines 236–242 and lines 246 and 248, the sorting defaults the pointer to the isolation table. The remaining possible pointing positions are given the following priority: the steering table 2 flag is given highest priority, the steering table 1 flag is given next highest priority, followed by the body table 4, body table 3, body table 2, body table 1 and the default and lowest priority table is the isolation table (no flags set). The flag with the highest priority controls the gain table pointer so that the gain table pointer points to the table corresponding to the flag with the highest priority.

Responsive to the gain table pointer signal on line 166 and the heave, roll and pitch velocities on lines 70, 72 and 74, respectively, block 260 computes body demand forces for each corner of the vehicle as follows. The gain table pointer 166 controls the set of gains that are selected from the computer memory represented by line 144. The selected gains and the computed body heave, roll and pitch velocities on lines 70-74 are then used to determine the body demand force as follows:

$$DF_b = G_h H' + G_r R' + G_p P'$$

where $DF_b$ is the body demand force, $G_h$ is the heave gain, $G_r$ is the roll gain, $G_p$ is the pitch gain, $H'$ is the body heave velocity, $R'$ is the body roll velocity and $P'$ is the body pitch velocity. The body demand force $DF_b$ is computed for each corner of the vehicle so that four body demand forces $DF_{b1}$, $DF_{b2}$, $DF_{b3}$ and $DF_{b4}$ are computed. The gains $G_h$, $G_r$ and $G_p$ for the front typically will vary from the gains $G_h$, $G_r$ and $G_p$ for the rear. The results of block 260 are the four body demand force signals provided in the four line bus 164.

Referring now again to FIG. 7, the wheel control block 168 responds to the buffered vehicle speed signal on line 52, the lateral acceleration on line 54, the four average wheel velocity signals on lines 80 and the four lead-lag filtered relative velocity signals on lines 78 to provide the wheel demand force signals, one for each corner of the vehicle, on bus 170.

Figure 13:
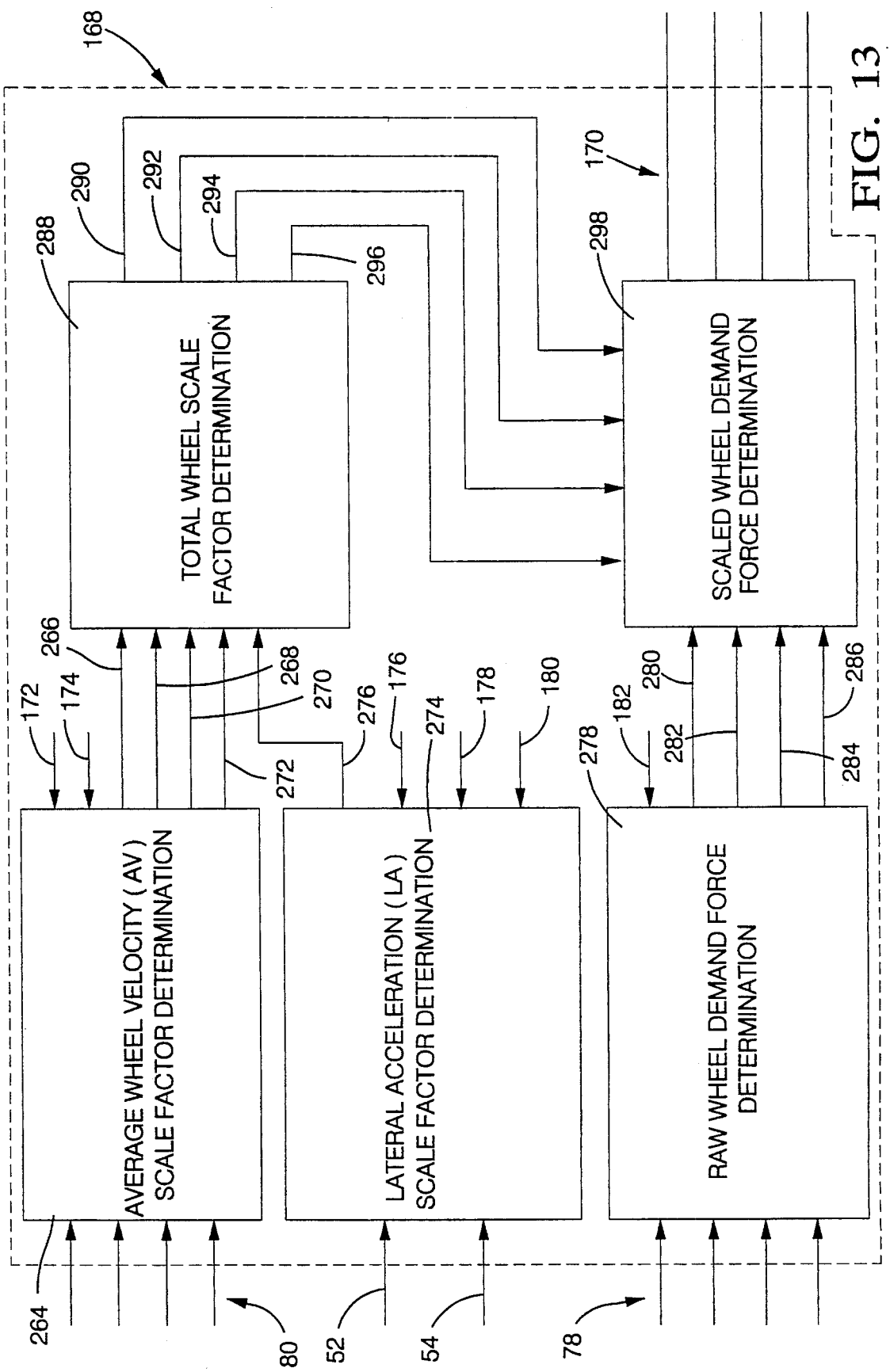
FIG. 13 illustrates a control diagram for determining and scaling wheel demand forces according to this invention.

More particularly, referring now also to FIG. 13, a more detailed illustration of the wheel control block 168 is shown. The wheel control block 168 includes block 278, which passively performs a non-linear function, once each on each of the lead-lag filtered relative velocity signals on lines 78. Line 182 represents the stored calibration points for the passive curve in the microcomputer memory. For example, the curve might include seven positive relative velocity calibration points and seven negative relative velocity calibration points that plot a non-linear curve. Different curves may be implemented for the front and rear suspensions.

Figure 14:
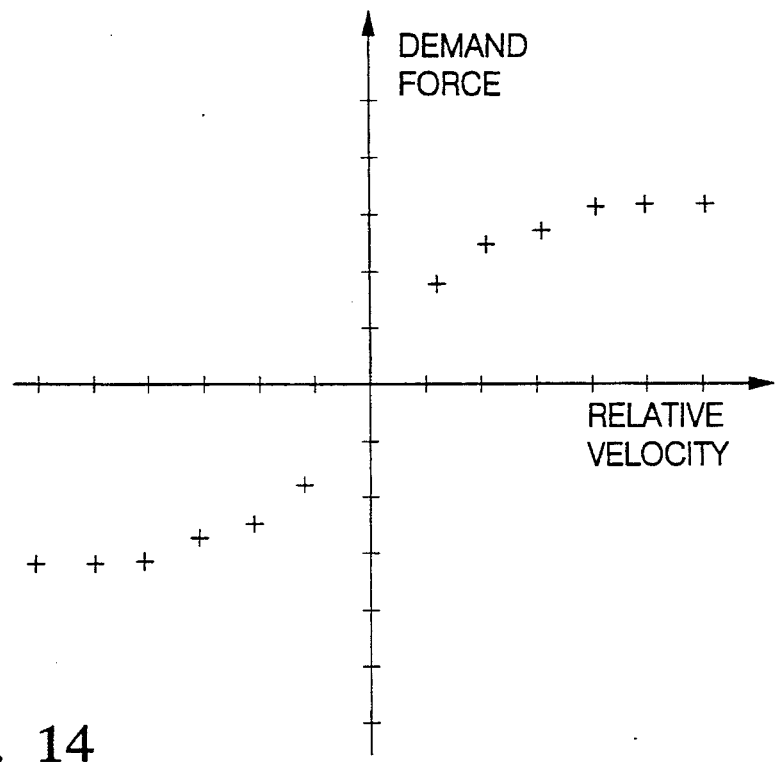
FIG. 14 illustrates an example plot of calibration points to implement a passive wheel curve according to this invention.
Figure 15:
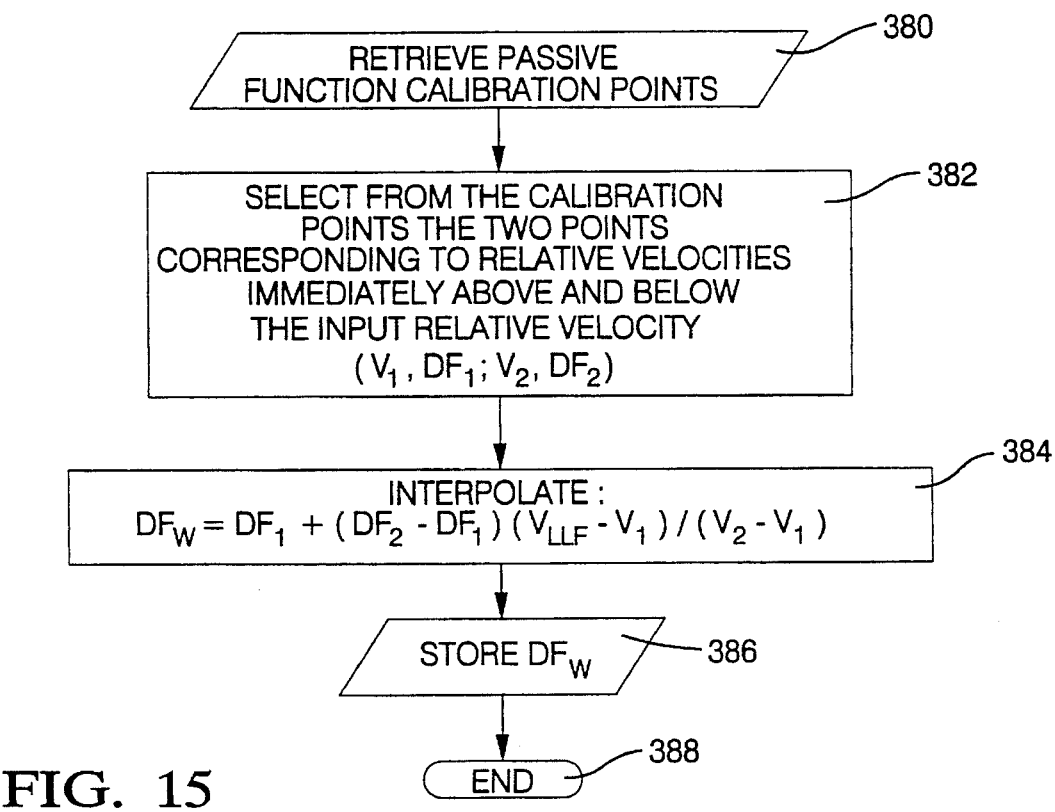
FIG. 15 illustrates a flow diagram for implementing the passive wheel curve according to this invention.

Referring to FIGS. 14 and 15, an example plot of six positive and six negative calibration points on a relative velocity versus demand force curve and an example flow diagram for implementing the passive wheel curve are is illustrated. The passive curve function is implemented as follows for each lead-lag filtered relative velocity signal. At block 380, the stored calibration points for the non-linear curves are retrieved from computer memory. At block 382, the lead-lag filtered relative velocity signal is compared to the calibration points and the two points immediately above and below the lead-lag filtered relative velocity are selected and designated as $v_1$, $DF_1$ and $v_2$, $DF_2$. Then, the wheel demand force is determined at block 384 by the interpolation equation:

$$DF_w = DF_1 + (DF_2 - DF_1)(v_{LLF} - v_1)/(v_2 - v_1),$$

where $DF_w$ is the wheel demand force, $v_{LLF}$ is the lead-lag filtered relative velocity, $v_1$ is the lower bounding relative velocity calibration point, $v_2$ is the upper bounding relative velocity calibration point, $DF_1$ is the demand force calibration corresponding to $v_1$ and $DF_2$ is the demand force calibration corresponding to $v_2$. Note: $v_1 < v_{LLF} < v_2$ and $DF_1 < DF_w < DF_2$. Block 386 stores the demand force $DF_w$ and the routine is ended at block 388. In the above manner, the linear interpolation between the calibration is performed for each lead-lag filtered relative velocity signal and the results on lines 280, 282, 284 and 286 are the raw wheel demand force signals for each wheel.

Figure 16:
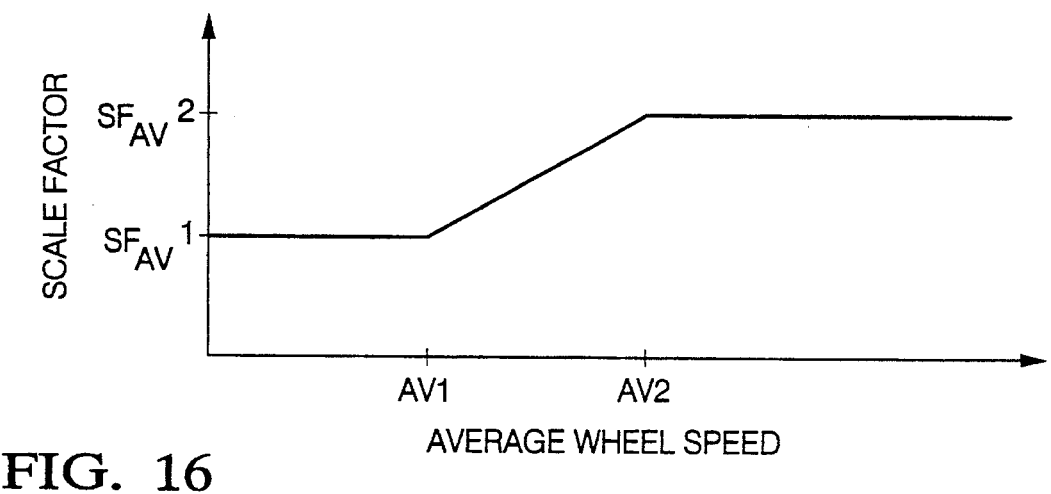
FIGS. 16 and 18 illustrate graphs for determining wheel control scale factors according to the control of FIG. 13.
Figure 17:
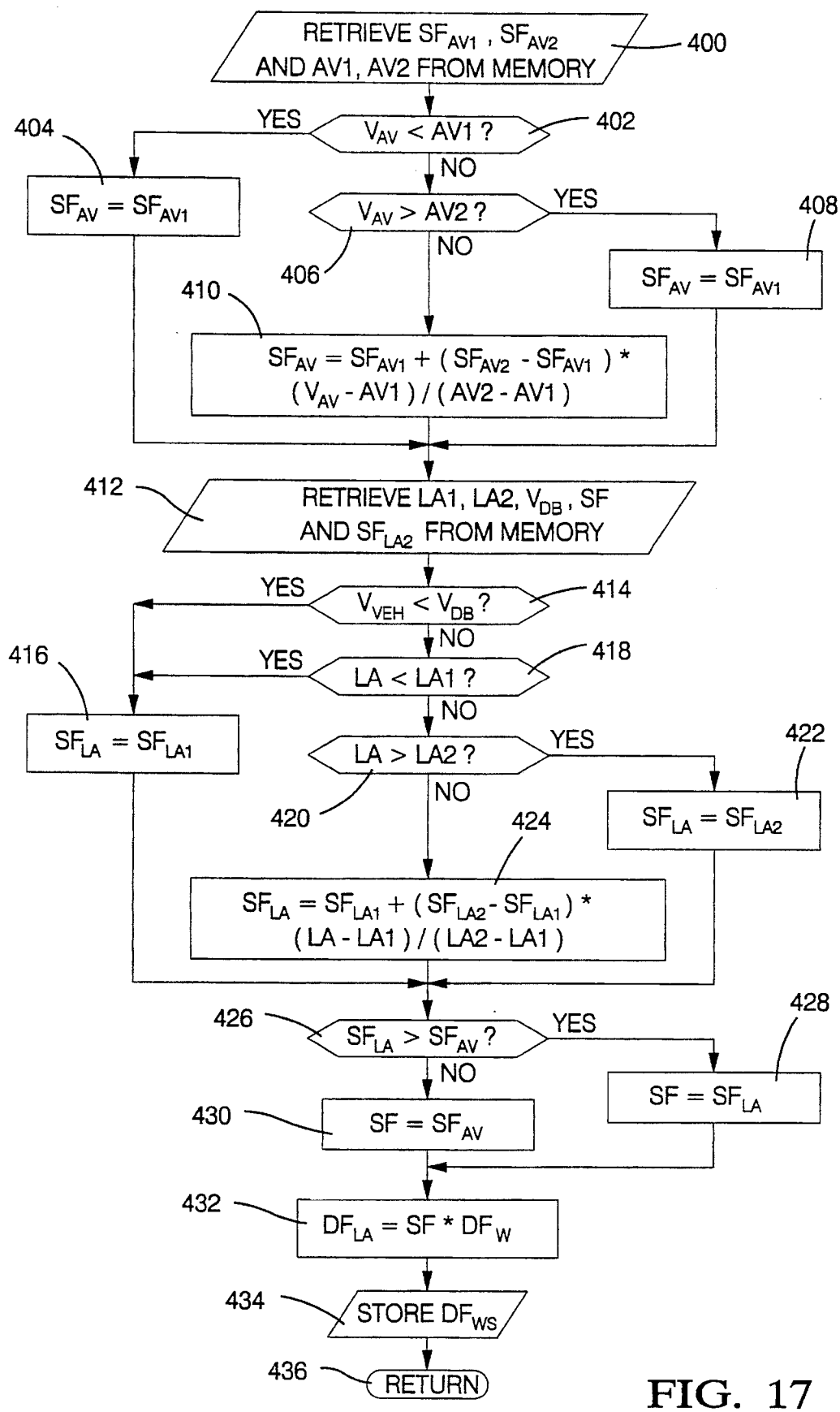
FIG. 17 illustrates a flow diagram for determining wheel demand force according to this invention.

Block 264 determines scale factors for each of the raw wheel demand force signals responsive to the average vertical wheel velocity signals on lines 80. For each of the lines 80, the scale factor is determined according to the graph shown in FIG. 16 responsive to the average vertical wheel velocity input, $v_{av}$. Line 172 represents the two scale factors $SF_{av1}$ and $SF_{av2}$ calibrated in computer memory and line 174 represents the average speed values AV1 and AV2 that determine the scale factor that is used. Referring now also to FIG. 17, the stored calibration values $SF_{av1}$, $SF_{av2}$, AV1 and AV2 are retrieved from memory at block 400. If the average vertical wheel velocity is below AV1 at block 402, then block 404 sets the average vertical velocity scale factor $SF_{av}$ equal to $SF_{av1}$. If the average vertical wheel velocity for that corner of the vehicle is above AV2 at block 406, then block 408 sets the average vertical velocity scale factor $SF_{av}$ equal to $SF_{av2}$. If the average vertical wheel velocity is not greater than AV2 and not less than AV1, then block 410 determines $SF_{av}$ as a linear interpolation between AV1 and AV2 according to:

$$SF_{av} = SF_{av1} + (SF_{av2} - SF_{av1})(v_{av} - AV1)/(AV2 - AV1)$$

A scale factor is determined for each corner of the vehicle and the scale factors are output on lines 266, 268, 270 and 272 to block 288 (FIG. 13).

Block 274 determines a single scale factor referred to as the lateral acceleration scale factor. The lateral acceleration scale factor is determined responsive to the speed signal on line 52 and the lateral acceleration signal on line 54 and is output on line 276. Line 176 represents the two scale factor calibrations programmed into microprocessor memory, line 178 represents the two lateral acceleration threshold points programmed into microprocessor memory and line 180 represents the speed dead band programmed into microprocessor memory.

Figure 18:
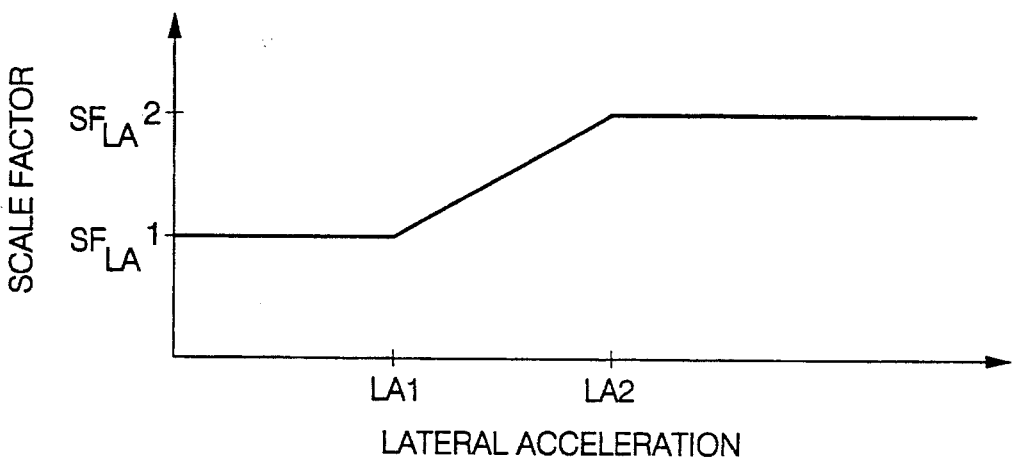

Referring now also to FIG. 18 and again to FIG. 17, the calibrations LA1, LA2, $v_{db}$, $SF_{LA1}$ and $SF_{LA2}$ are retrieved from memory at block 412. If at block 414, the vehicle speed $v_{veh}$ is less than the dead band speed, $v_{db}$, for example, 20 m.p.h., then the scale factor $SF_{LA}$ is set equal to $SF_{LA1}$ at block 416, where $SF_{LA1}$ is one of the two calibrated scale factors provided on line 176 together with $SF_{LA2}$.

If the vehicle speed is above the dead band and lateral acceleration, LA, is below the calibrated value LA1 at block 418, then block 416 sets the lateral acceleration scale factor equal to $SF_{LA1}$. If the lateral acceleration is greater than the calibrated point LA2 at block 420, then block 422 sets the lateral acceleration scale factor equal to the value $SF_{LA2}$. If the lateral acceleration is not less than LA1 and not greater than LA2, then block 424 determines the lateral acceleration scale factor, $SF_{LA}$, as a linear interpolation between LA1 and LA2 according to the equation:

$$SF_{LA} = SF_{LA1} + (SF_{LA2} - SF_{LA1})(LA - LA1)/(LA2 - LA1))$$

The resultant lateral acceleration scale factor $SF_{LA}$ is output on line 276 to block 288 (FIG. 13).

Block 288 determines the scale factor to be applied to each wheel responsive to the scale factors on lines 266, 268, 270, 272 and 276 by choosing, for each wheel, the greater of the wheel velocity scale factor for that wheel and the lateral acceleration scale factor and providing that selection on the appropriate output line 290, 292, 294 and 296. This is performed at block 426 (FIG. 17) which compares $SF_{LA}$ to $SF_{AV}$. If $SF_{LA}$ is greater than $SF_{AV}$, then block 428 sets the scale factor SF equal to $SF_{LA}$. Otherwise, block 430 sets the scale factor equal to $SF_{AV}$. At block 298 (FIG. 13, corresponding to block 432, FIG. 17) the scaled wheel demand forces are determined by multiplying each raw wheel demand force on lines 280–286 by the corresponding scale factor on lines 290–296. Block 434 stores the scaled wheel demand forces in memory and the routine in FIG. 17 ends at block 436.

The routine illustrated in FIG. 17 is performed once for each corner of the vehicle to determine the four scaled wheel demand forces. The resultant scaled wheel demand forces are output on bus 170 (FIG. 13).

Referring now again to FIG. 7, block 184 determines the total demand force for each corner of the vehicle responsive to the four body demand forces on bus 164, the four wheel demand forces on bus 170 and the four lead-lag filtered relative velocity signals on lines 78. While the example below is determined responsive to the lead-lag filtered relative velocity signal, if a lead-lag filter is not implemented, a non-lead-lag filtered relative velocity signal may be implemented instead.

More particularly, block 184 determines the total demand force, $DF_{tot}$, for each actuator by combining the wheel and body demand forces, $DF_w$ and $DF_b$, respectively, based upon the phase of the demand forces. If the body and wheel demand forces are in-phase, the demand force is determined according to a wheel force as a minimum approach. That is, the demand force is set equal to the body demand force unless the body demand force is less than the wheel demand force, in which case, the total demand force is set equal to the wheel demand force. If the wheel and body demand forces are out of phase, the wheel and body demand forces are summed to generate the total demand force.

Damper systems that do not provide energy from another source, such as a compressor storing high pressure hydraulic fluid, are referred to as passive, meaning they can only generate force that is the same sign (direction) as the relative velocity of the damper. Active dampers that have external supplies of energy can supply force independent of the relative velocity of the damper. On a force-versus-relative velocity plot, the passive quadrants are the first and third quadrants, that is, the quadrant in which relative velocity and force are both positive and the quadrant in which relative velocity and force are both negative. In the second and fourth quadrants, a passive damper cannot provide a commanded force.

The wheel demand force, according to this invention, is a function of relative velocity, will always have the same sign as the relative velocity and will always be passive. The body demand force may be active or passive. If the body and wheel demand forces are both passive, the demand forces are in-phase. If the body demand force is active, the demand forces are out-of-phase.

Figure 19:
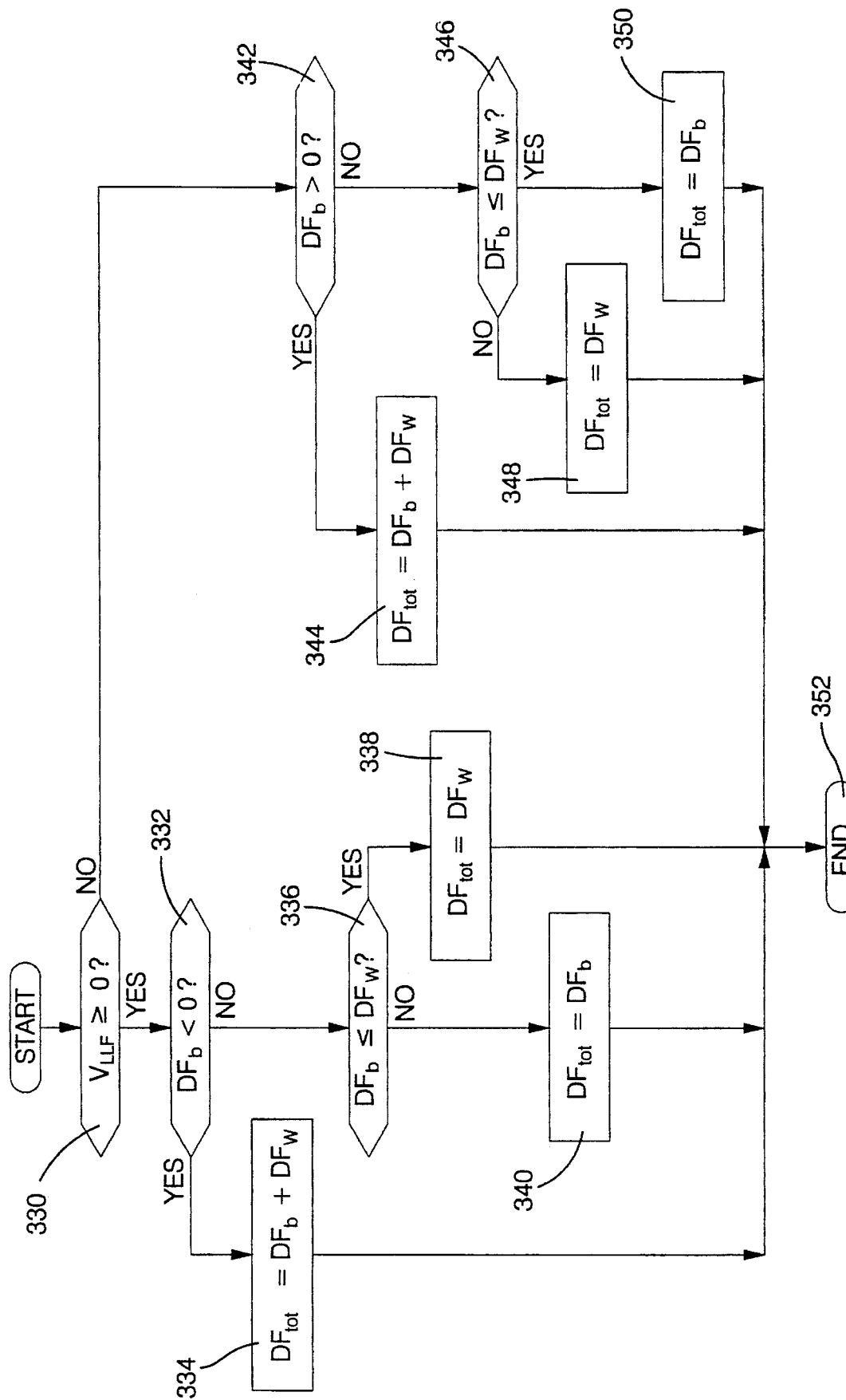
FIG. 19 illustrates a flow diagram for implementing phase-based determination of total demand force according to this invention.

Referring now to FIG. 19, an example flow routine for determining the total demand force for an actuator in the phase dependent manner according to this invention is set forth. The routine starts and moves to block 330 where it compares the lead-lag filtered relative velocity for the particular corner of the vehicle to zero. If the lead-lag filtered relative velocity is greater than zero, the routine moves to block 332 where it compares the body demand force to zero. If the body demand force is less than zero, then the system is out-of-phase and block 334 determines the total demand force ($DF_{tot}$) equal to the sum of the body demand force ($DF_b$) and the wheel demand force ($DF_w$) for that particular wheel. If at block 332, the body demand force is not less than zero, then the body demand force and wheel demand force are in-phase and the routine moves to block 336 where it compares the body demand force to the wheel demand force. If the body demand force is less than or equal to the wheel demand force, the routine moves to block 338 where the total demand force is set equal to the wheel demand force. Otherwise, the routine moves to block 340 where the total demand force is set equal to the body demand force.

If at block 330 the lead-lag filtered relative velocity is not greater than or equal to zero, the routine moves to block 342 where it compares the body demand force to zero. If the body demand force is greater than zero, then the body and wheel demand forces are out-of-phase and block 344 determines total demand force equal to the sum of the body demand force and the wheel demand force. If at block 342 the body demand force is not greater than zero, then the body demand force and wheel demand force are in-phase and block 334 compares the body demand force to the wheel demand force. If the body demand force at block 346 is less than or equal to the wheel demand force, the routine moves to block 350 where the total demand force is set equal to the wheel demand force and otherwise to block 348 where the total demand force is set equal to the body demand force. Once the total demand force is determined, the routine exits at block 352.

The routine shown in FIG. 19 is executed for the front left, rear left, front right and rear right corners of the vehicle using the wheel demand forces, $DF_w$, for the front left, rear left, front right and rear right corners of the vehicle, respectively, to determine the total demand force for each actuator in the controllable variable force suspension system. The results of block 184 (FIG. 7) are four total demand force signals on bus 188, one for each corner of the vehicle. Block 190 performs a limiting function on the total demand force signals on bus 188 responsive to the lead-lag filtered relative velocity signals, the vehicle speed signal on line 52 and the diagnostics signal on line 140.

Figure 20:
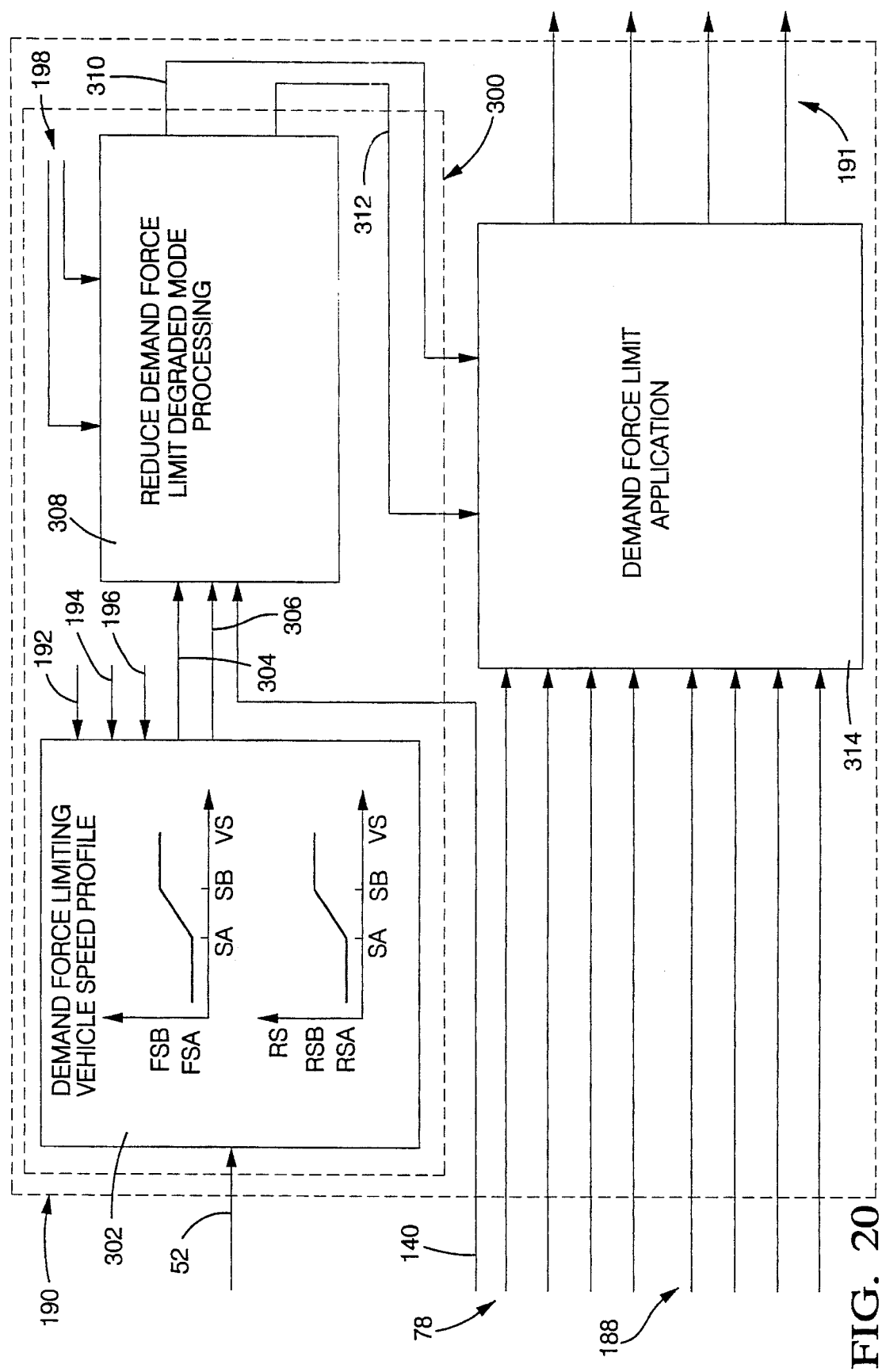
FIG. 20 illustrates a block diagram for limiting demand force according to this invention.

Referring now also to FIG. 20, the demand force limiting block 190 is shown in more detail. In general, block 190 dynamically determines a maximum slope for the demand force curve, determines the maximum demand force responsive to that slope and limits the total demand force to that computed maximum. The limiting slope is determined at block 302 responsive to the vehicle speed signal on line 52 ($v_{veh}$). Separate front and rear limiting slopes are implemented. Lines 192, 194 and 196 represent the calibrations in the computer memory of the from slope A (FSA), from slope B (FSB), rear slope A (RSA), rear slope B (RSB) and the limiting speeds SA and SB. If the vehicle speed is below the limiting speed SA, then the front and rear slopes are FSA and RSA respectively. If the vehicle speed is greater than SB then the front and rear slopes are FSB and RSB respectively. If the vehicle speed is between SA and SB, then the front and rear slopes are determined as linear interpolations as follows:

Front slope=$FSA+(FSB-FSA)(v_{veh}-SA)/(SB-SA)$; and

Rear slope=$RSA+(RSB-RSA)(v_{veh}-SA)/(SB-SA)$).

The resultant determined from and rear slopes are output on lines 304 and 306 and are provided to block 308.

Block 308 limits the front and rear slopes if a signal on line 140 indicates that the ambient temperature is below a predetermined threshold, for example, −25 degrees Fahrenheit, in which case the front and rear slopes are limited to predetermined low ambient front and rear slopes, respectively, represented by lines 198. (Note: At vehicle speeds greater than, for example 100 MPH, block 308 does not limit the front and rear slopes in response to a signal on line 140 indicating low ambient temperature.) The resultant slopes on lines 310 and 312 are provided to block 314 along with the lead-lag filtered relative velocity signals on lines 78 and the total demand force signals on bus 188.

At block 314, a maximum demand force is computed according to the slope on line 310 for the front and line 312 for the rear multiplied by the lead-lag filtered relative velocity signal for the two front suspensions for the front and the two rear suspensions for the rear. Each total demand force on the bus 188 is compared to the corresponding computed maximum demand force and, if the total demand force is greater than the corresponding computed maximum demand force, the total demand force is limited to the corresponding computed maximum demand force. This is done for each total demand force so that the resultant output on bus 191 are not greater than the corresponding maximum demand forces.

Referring again to FIG. 7, once the demand forces are limited at block 190, the resultant demand forces on bus 191 are provided to block 200, which provides raw PWM duty cycle signals on bus 201 responsive to the signals on bus 191, the lead-lag filtered signals on lines 78 and the high pass relative velocity signals on line 76.

Figure 21:
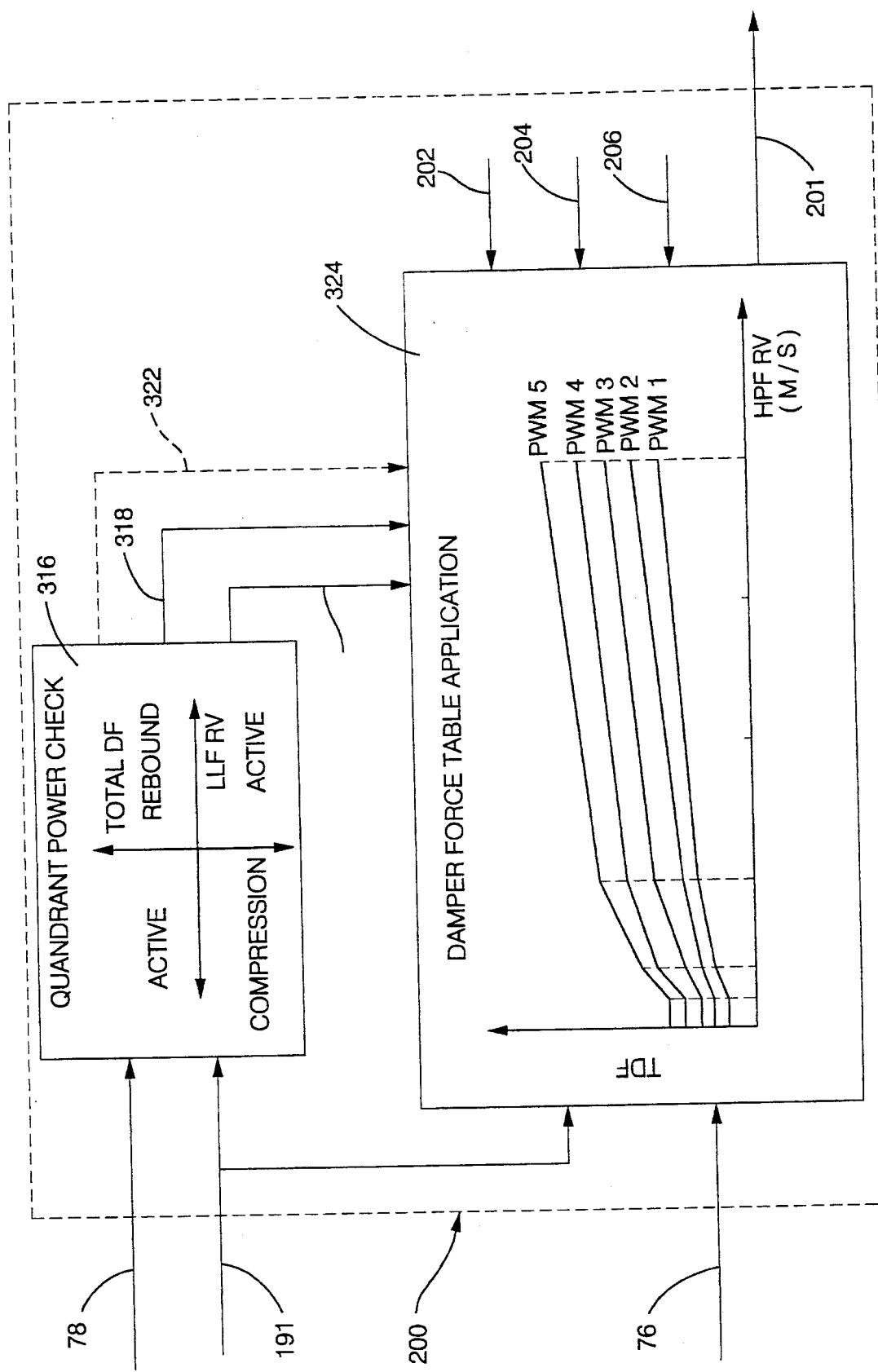
FIG. 21 illustrates a control diagram for determining a duty cycle for control of a PWM controlled actuator according to this invention.

Referring now also to FIG. 21, block 200 is shown in more detail. At block 316, the lead-lag filtered relative velocity signal and the total demand force signal for a particular corner are compared to determine if that corner suspension is in compression or rebound. If both the lead-lag filtered signal and demand force signal are positive, then the system is in rebound mode. If both the lead-lag filtered signal and the demand force signal are negative, then the system is in compression mode. This comparison is made at block 316 and resultant flags of compression, line 318, and rebound line 320, are set to indicate the quadrant of the graph in block 3 16 in which the corner suspension is operating. Dotted line 322 represents that when the system is in neither the rebound nor the compression quadrants, but in one of the active quadrants, the damper force table is bypassed.

Block 324 represents the application of the damper force table to determine a raw PWM duty cycle command. The damper force table is implemented using table values 202 stored in memory, PWM duty cycles 204 stored in memory and a damper force axis intercept scale factors 206 stored in memory. The inputs to the table at 324 are the total demand force and the high pass filtered relative velocity for each corner.

Figure 22:
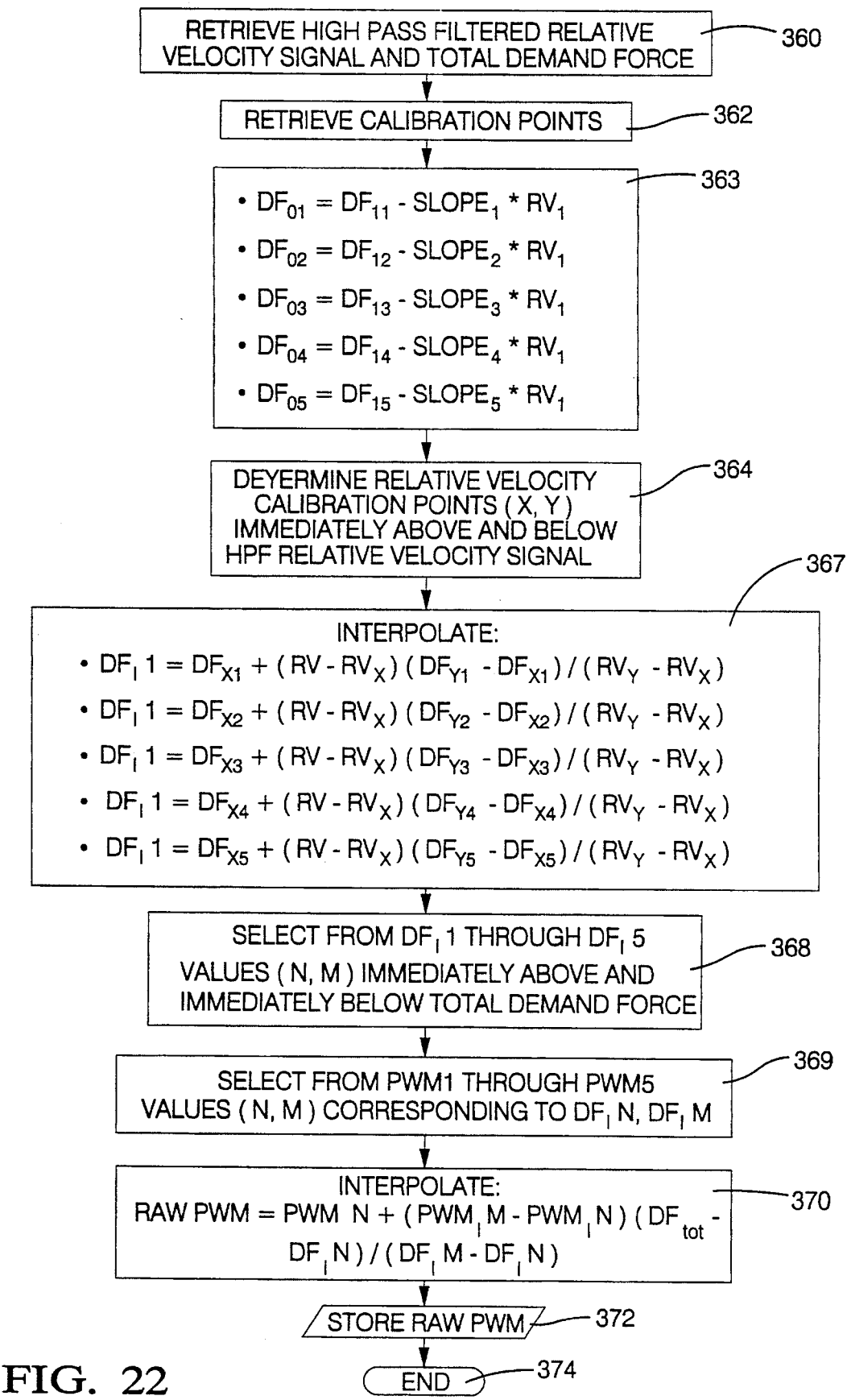
FIG. 22 illustrates a flow diagram according to this invention.

Referring now also to FIG. 22, the look-up table is implemented as follows. A set of points is designated, which points are shown on the table and correspond to the calibration points provided from memory, reference 202. Different tables are provided for rebound and compression as designated by the flags on lines 318 and 320. For each corner of the vehicle, the raw PWM signal is determined as follows: The input high pass filtered relative velocity signal, retrieved at block 360 along with the total demand force signal for the corner, is compared to the calibrated points retrieved from memory at block 362. In the example implementation, there are no calibration points for the RV=0 axis, so the RV=0 calibration points are determined at block 363 responsive to the calibration points at $RV_1$ and stored slope values (axis intercept scale factors) according to:

$$DF_{01}=DF_{11}-SLOPE_1*RV_1,$$

$$DF_{02}=DF_{12}-SLOPE_2*RV_1,$$

$$DF_{03}=DF_{13}-SLOPE_3*RV_1,$$

$$DF_{04}=DF_{14}-SLOPE_4*RV_1, \text{ and}$$

$$DF_{05}=DF_{15}-SLOPE_5*RV_1,$$

where $DF_{01}$ through $DF_{05}$ are the calculated calibration points at RV=0, where RV1 is the first relative velocity calibration point, where $DF_{11}$–$DF_{15}$ are the calibrated demand forces corresponding to RV1 for the five demand force curves and $SLOPE_1$ through $SLOPE_5$ are the five stored slopes, which may all be the same value in some implementations or different values in other implementations.

At block 364, the two plotted relative velocity points immediately above and below the filtered relative velocity signal are found and are designated as $RV_Y$ and $RV_X$, respectively.

Block 367 interpolates between the velocity points $RV_X$ and $RV_Y$ for each of the PWM plots to find the five DF points, $DF_f1, DF_f2, DF_f3, DF_f4$ and $DF_f5$ that correspond to the particular input filtered relative velocity signal, RV, according to:

$$DF_f1=DF_{X1}+(RV-RV_X)(DF_{Y1}-DF_{X1})/(RV_Y-RV_X),$$

$$DF_f2=DF_{X2}+(RV-RV_X)(DF_{Y2}-DF_{X2})/(RV_Y-RV_X),$$

$$DF_f3=DF_{X3}+(RV-RV_X)(DF_{Y3}-DF_{X3})/(RV_Y-RV_X),$$

$$DF_f4=DF_{X4}+(RV-RV_X)(DF_{Y4}-DF_{X4})/(RV_Y-RV_X), \text{ and}$$

$$DF_f5=DF_{X5}+(RV-RV_X)(DF_{Y5}-DF_{X5})/(RV_Y-RV_X),$$

where $DF_{Xa}$ (a=1 through 5) are the calibrated demand force points corresponding to $RV_X$ and where $DF_{Ya}$ (a=1 through 5) are the calibrated demand force points corresponding to $RV_Y$.

At block 368, the two of the demand forces $DF_f1$ through $DF_f5$ that are immediately above and below the total demand force $DF_{tot}$ are selected and designated as $DF_fN$ and $DF_fM$.

At block 369, the two of the PWM curves PWM1 through PWM5 that correspond to $DF_fN$ and $DF_fM$ are selected and designated as $PWM_{IN}$ and $PWM_{IM}$. Block 370 then determines the RAW PWM command as a linear interpolation between $DF_fM$ and $DF_fN$ as follows:

$$i \text{ RAW PWM}=PWM_fN+(PWM_M-PWM_N)(DF_{tot}-DF_fN)/(DF_fM-DF_fN).$$

The RAW PWM command is then storm at block 372 and the routine is exited at block 374. The result is a signal on bus 201 representing the raw PWM duty cycle.

Blocks 316 and 324 (FIG. 21) are performed once for each corner of the vehicle, requiring a total of up to eight tables in the preferred implementation because different tables are used for compression and rebound. (Note: The front left and right tables may be identical and the rear left and right tables may be identical, in which case there are a total of four tables.) In total, on bus 201, four signals are provided representing the four raw duty cycle commands for the four corners of the vehicle.

Above is one example of how to derive duty cycle commands from demand force. Numerous other approaches are possible. For example, a simple mapping can be implemented as follows: if $DF_{tot}<DF_A$, then RAW PWM=PWMA; if $DF_{tot}>DF_B$, then RAW PWM=PWMB; and otherwise RAW PWM=PWMA+$(DF_{tot}-$DFA$)$(PWMB−PWMA)/ (DFB−DFA), where DFA and DFB are minimum and maximum calibrated demand forces and PWMA and PWMB are the minimum and maximum PWM commands correlating to DFA and DFB, respectively.

Referring again to FIG. 7, the raw PWM duty cycle commands on bus 201 are output to block 208 where they are slew filtered in the manner described in United States patent application 08/409,441, filed concurrently with this invention and assigned to the assignee of this invention. The slew filter has separate up and down limits on the rate of change of the PWM signals used to control the variable force actuators to limit noise created by sudden changes in damper force, limit high frequency cycling of the damper valves and attenuate high frequency components of the damper valve command.

Block 208 is responsive to the raw PWM duty cycle signals on bus 201, the gain table pointer on line 166 and the body demand force signals on bus 164. If the gain amble pointer points to the isolation table, then the isolation up/down slew limits on lines 210 are used to limit the rate of change of the PWM signal. If the gain table pointer points to any of the other tables, then the body up and down slew limits on lines 212, 214 and 216 are used as the slew limits for the PWM signals on bus 201. The slew factors in the downward direction may be a function of body demand force, for example, greater demand forces corresponding to longer slew times. The slew filtered signals are output from block 208 to output lines 218 containing the four slew filtered PWM signals.

Lines 218 are provided to block 220, which may be implemented if desired to calibrate a minimum PWM command for each actuator. This minimum command on line 222 is used as a floor below which the duty cycle of the PWM command cannot fall. The resultant output signals on lines 84, 86, 88 and 90 are the filtered PWM duty cycle commands.

According to this invention, it is recognized that the suspension control algorithm implementation shown is most accurate when the battery voltage input to the controller is within a small band around the voltage levels at which the actuators were characterized for performance when the system is calibrated. During extremes in voltage operating range, the duty cycle commands to the actuators would produce current levels and, therefore, damper loads, that vary from the targeted levels. To limit this variation, the filtered duty cycle commands are treated as if they are accurate at a single predetermined battery voltage. Thus, at higher or lower voltage levels, the duty cycles are adjusted, or scaled, upward or downward, as appropriate, to produce the current level that would have occurred at the original duty cycle and the reference battery voltage.

The controller determines a battery scale factor responsive to the analog battery voltage input and a four point look-up table relating battery scale factor calibration values to battery voltage levels. In an example implementation, the four point look-up table has four indices corresponding to battery levels as follows: BV1=10 volts, BV2=12 volts, BV3=14 volts and BV4=16 volts, and each indicia has a corresponding scale factor, BSF1, BSF2, BSF3 and BSF4. The scale factors are easily determined by a system designer by forcing the battery line to each of the four indices and measuring the PWM output average current for a given set of input parameters. The measured output is then compared to the ideal output for the set of input parameters and the ratio of the ideal PWM output average current to the measured PWM output average current is the scale factor (BSF1, 2, 3 or 4) for that input voltage indicia.

Figure 23:
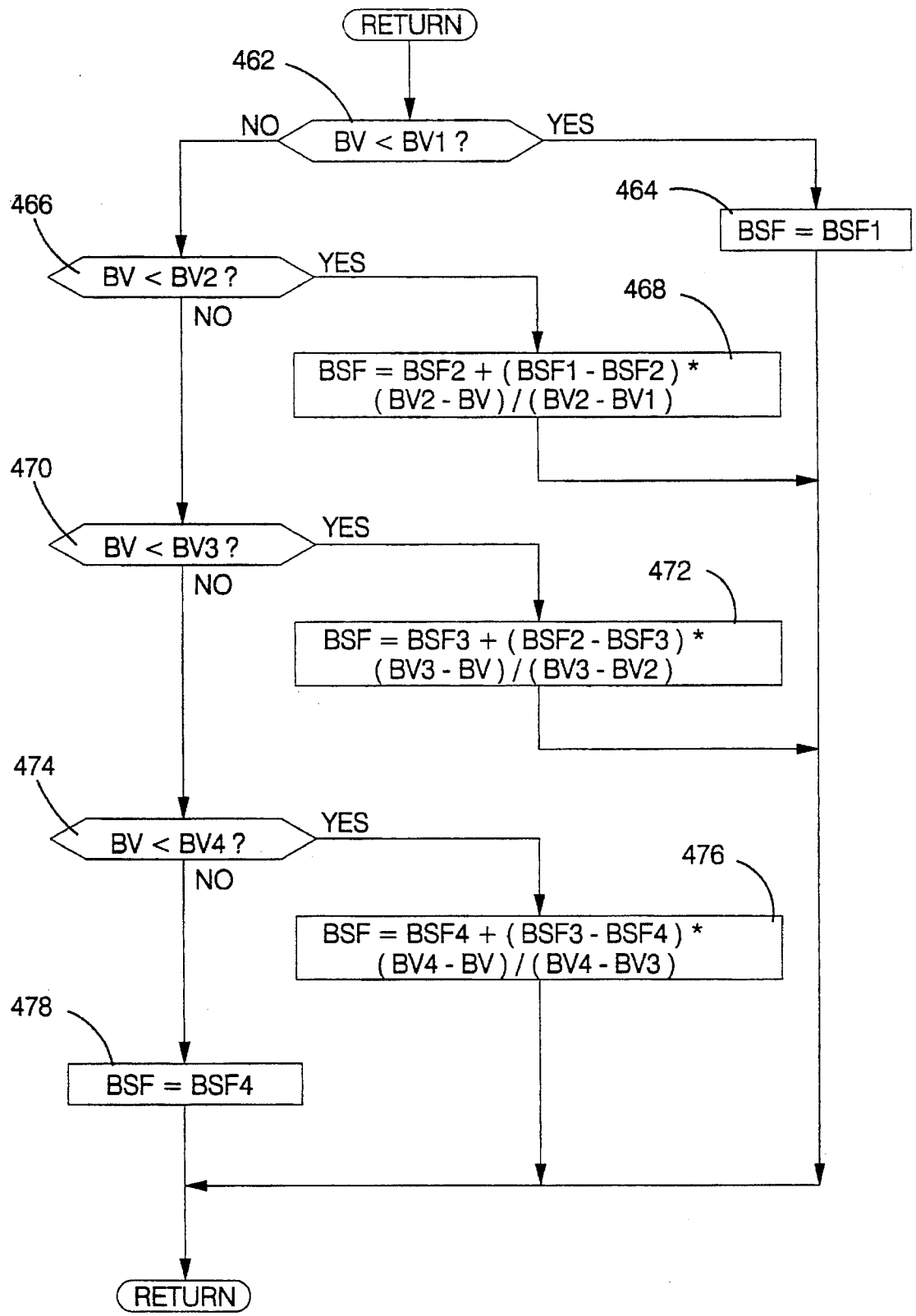
FIG. 23 illustrates a flow diagram for implementing environmental compensation according to this invention.

Referring now again to FIG. 2, the filtered PWM duty cycle commands are scaled responsive to the battery voltage signal on line 58 at block 92 as illustrated in FIG. 23. At block 462, the controller compares the vehicle battery voltage BV to the first look-up table indicia, BV1, and if BV is less than BV1, then the scale factor BSF is set to the scale factor BSF1 at block 464. If BV is not less than BV1, then the routine moves to block 466, where BV is compared to BV2. If at block 466 BV is less than BV2, then at block 468, the scale factor is determined as an interpolation between BSF1 and BSF2 as follows:

$$BSF=BSF2+(BSF1-BSF2)*(BV2-BV)/(BV2-BV1).$$

If at block 466, BV is less than BV2, the routine moves to block 470 where BV is compared to BV3. If BV is less than BV3, then the routine moves to block 472, where the scale factor is determined as an interpolation between BSF2 and BSF3 as follows:

$$BSF=BSF3+(BSF2-BSF3)*(BV3-BV)/(BV3-BV2).$$

If at block 470, BV is less than BV3, then the routine moves to block 474, where BV is compared to BV4. If BV is less than BV4, then the routine moves to block 476 where the scale factor is determined as an interpolation between BSF3 and BSF4 as follows:

$$BSF=BSF4+(BSF3-BSF4)*(BV4-BV)/(BV4-BV3).$$

If at block 474, BV is not less than BV4, then the routine moves to block 478 where the scale factor BSF is set equal to BSF4.

The filtered PWM duty cycle commands are then scaled by multiplying each filtered command by the scale factor BSF to obtain the scaled PWM commands for the right front, left front, right rear and left rear suspensions. Additionally, if the BSF factors are not scaled 0–1, for example, if the BSF factors are scaled 0–2, then an overflow check is necessary.

In the event that the multiplication of a particular filtered PWM duty cycle command by the scale factor BSF causes an overflow result greater than the maximum duty cycle, the scaled PWM command is set to the maximum duty cycle command (i.e., 100% duty cycle).

The resultant scaled signals on lines 94, 96, 98 and 100 (FIG. 2) are provided to block 110, the optional override block. If a signal on line 66 indicates that the system is in override mode, a predetermined signal is output on each of lines 112–118 to control the actuators for testing. Also, if the diagnostics line 56 carries an error signal indicating that there is an error in the system, block 110 overrides the determined PWM commands on lines 94–100 and provides a default PWM command that is scaled simply in response to vehicle speed, for example, as vehicle speed increases, the duty cycles of the PWM commands increase. This may be done in either a step-wise or a linear manner. The resultant control outputs are provided on lines 112–118, which carry the duty cycle commands for the four actuators in the suspension system and the damper low side control command on line 120. The duty cycle commands on lines 112–118 are converted in a known manner to pulse width modulated signals having the duty cycles commanded by the lines 112–118.

An example suitable microprocessor controller is a Motorola 68HC11 KA4, which is adapted for providing PWM output control commands. The interface between the microprocessor controller and the variable force dampers may be as follows.

Assume for purposes of example that each actuator 12 controls damping force responsive to a continuously variable electro-hydraulic pressure regulating valve assembly of the type shown in U.S. Pat. No. 5,282,645, issued Feb. 1, 1994, assigned to the assignee of this invention. The disclosure of U.S. Pat. No. 5,282,645 is incorporated herein by reference. The valve responds to a pulse width modulated signal and provides a continuously variable range of decrease in flow restriction of a bypass passage to the reservoir of the damper between maximum restricted flow when the valve is closed in response to a 0% duty cycle command and a minimum restricted flow when the valve is open and responsive to 100% duty cycle command, or vice versa. Each example valve includes a solenoid that, responsive to the PWM command for that damper, controls the flow restriction of that valve. A P-channel FET may be used as the switch for the high side of the valve solenoid and the low side of the valve solenoid is coupled via another FET controlled by output line 120, the damper low side control. The high side P-channel FET may be driven by an N-channel FET that is directly driven by the output of the microprocessor. EMI filtering in a known manner may be implemented if desired. Similar circuit control may be implemented for the low side FET.

Those skilled in the art will understand that any suitable microprocessor-based controller capable of providing the appropriate actuator command for and performing the required control routine can be used in place of the example set forth herein and are equivalents thereof.

It has been shown that this invention reduces the amount of time the suspension is in wheel mode after an event such as a vehicle running over a railroad track. In one example, the control according to the prior art scheme of simply adding the wheel and body commands remained in the wheel mode for approximately 420 milliseconds after the railroad track event. When this invention was implemented with the phase-based control responsive to the wheel and body commands, the suspension was removed from wheel mode after only 360 milliseconds. This indicates that the control, according to this invention, reduces wheel velocity vertical movements faster than the prior art.

Further data indicates that for pure wheel events, this invention does not adversely affect performance. However, when the event requires body and wheel control the phase-based control of this invention reduces the trade-offs between passenger isolation and wheel control. The implementation of the passive wheel curve function according to this invention allows system designers to obtain desired levels of wheel control without being limited to one or more predetermined linear gains, which may sacrifice passenger isolation. In one example, a system using the passive wheel curve according to this invention was compared to a system implementing commands determined using gains as taught by the prior art. Acceleration of the vehicle body as measured in the vehicle trunk was reduced from 6 m/s$^2$ to 4 m/s$^2$ using the same test set-up. This reduction of body acceleration provides improved passenger isolation and no additional radially expansive wheel deflection was exhibited.

The above-described implementations of this invention are example implementation. Moreover, various other improvements and modifications to this invention may occur to those skilled in the art and those improvements and modifications will fall within the scope of this invention as set forth below.

The embodiments of this invention in which an exclusive property or privilege is claimed are defined as follows:

1. A method of controlling a vehicle suspension system comprising the steps of:

determining a relative velocity between a wheel and a corresponding corner of a vehicle body;

determining responsive to the relative velocity, according to a non-linear passive function, a raw wheel demand force;

determining an average vertical velocity of the wheel;

determining, responsive to the average vertical velocity of the wheel, a first scaling factor;

multiplying the first scaling factor by the raw wheel demand force to determine a scaled wheel demand force; and controlling the vehicle suspension system responsive to the scaled wheel demand force.

2. The method of claim 1 also comprising the steps of:

determining, responsive to a vehicle speed signal and a vehicle lateral acceleration signal, a second scaling factor, wherein, the step of multiplying the first scaling factor by the raw wheel demand force is executed only if the first scaling factor is greater than the second scaling factor; and if the second scaling factor is greater than the first scaling factor, multiplying the second scaling factor by the raw wheel demand force to determine the scaled wheel demand force.

3. The method of claim 1 wherein the step of controlling the vehicle suspension system is also responsive to a body demand force determined responsive to body heave, pitch and roll velocities.

4. The method of claim 1 wherein the step of determining the relative velocity between the wheel and the corner of the vehicle body comprises the sub-step of:

measuring the relative velocity between the wheel and the corner of the vehicle body.

5. The method of claim 1 wherein the step of determining the relative velocity between the wheel and the corner of the vehicle body comprises the sub-steps of:

measuring a relative position between the wheel and the corner of the vehicle body to obtain a relative position signal; and differentiating the relative position signal to obtain a signal representative of the relative velocity.

6. An apparatus comprising:

a suspended vehicle body;

four un-suspended vehicle wheels;

four variable force actuators mounted between the vehicle body and wheels at four corners of the vehicle;

four sensors, one sensor mounted at each of the four corners of the vehicle, each sensor comprising one member of a group of sensors comprising: a relative position sensor and a relative velocity sensor;

a microprocessor control unit comprising, for each corner of the vehicle, (a) means for receiving a sensor signal from the sensor mounted at the corresponding corner of the vehicle, (b) means for determining responsive to the sensor signal, according to a nonlinear passive function, a raw wheel demand force, (c) means for determining an average vertical velocity of the wheel, (d) means for determining, responsive to the average vertical velocity of the wheel, a first scaling factor, (e) means for multiplying the first scaling factor by the raw wheel demand force to determine a scaled wheel demand force, and means for controlling one of the four variable force actuators responsive to the scaled wheel demand force.

* * * * *